(12) United States Patent
Wakizono et al.

(10) Patent No.: US 10,675,917 B2
(45) Date of Patent: **\*Jun. 9, 2020**

(54) TIRE

(71) Applicant: Sumitomo Rubber Industries, Ltd., Kobe-shi, Hyogo (JP)

(72) Inventors: Aya Wakizono, Kobe (JP); Hiroshi Yamaoka, Kobe (JP)

(73) Assignee: SUMITOMO RUBBER INDUSTRIES, LTD., Kobe-shi, Hyogo (JP)

(\*) Notice: Subject to any disclaimer, the term of this patent is extended or adjusted under 35 U.S.C. 154(b) by 218 days.

This patent is subject to a terminal disclaimer.

(21) Appl. No.: 15/915,926

(22) Filed: Mar. 8, 2018

(65) Prior Publication Data

US 2018/0264892 A1 Sep. 20, 2018

(30) Foreign Application Priority Data

Mar. 16, 2017 (JP) .................................. 2017-051639

(51) Int. Cl.
*B60C 11/12* (2006.01)
*B60C 11/03* (2006.01)
*B60C 11/13* (2006.01)

(52) U.S. Cl.
CPC ...... *B60C 11/1263* (2013.01); *B60C 11/0306* (2013.01); *B60C 11/1204* (2013.01);
(Continued)

(58) Field of Classification Search
CPC ......... B60C 2011/0376; B60C 11/1236; B60C 2011/0365; B60C 2011/0381; B60C 2011/0383; B60C 2011/1254
See application file for complete search history.

(56) References Cited

U.S. PATENT DOCUMENTS 3,841,372 A * 10/1974 Boileau ..................... B60C 9/20
152/209.1
4,351,381 A * 9/1982 Roberts ............... B60C 11/0306
152/209.18
(Continued)

FOREIGN PATENT DOCUMENTS

EP 3 269 565 A1 1/2018
JP 3813709 B2 * 8/2006 ........... B60C 11/125
(Continued)

OTHER PUBLICATIONS

Extended European Search Report dated Jul. 4, 2018, in European Patent Application No. 18161426.4.

*Primary Examiner* — Xiao S Zhao
*Assistant Examiner* — John J Derusso
(74) *Attorney, Agent, or Firm* — Birch, Stewart, Kolasch & Birch, LLP

(57) ABSTRACT

A tire comprises center blocks 4 comprising a first center lateral groove 5A and a second center closed sipe 6a opposed to each other in a tire axial direction, and a second center lateral groove 5B and a first center closed sipe 6b axially opposed to each other. Lengths thereof satisfy the followings: LA/LA0≤½, LB/LB0≤½, Lb/Lb0 in a range of from ⅓ to ⅔, La/La0 in a range of from ⅓ to ⅔, LA<La, (LA+La)<LA0, LB<Lb, and (LB+Lb)<LB0. The center blocks 4 comprise a high rigidity region extending continuously between penetrating sipes 3 and between a first imaginary line passing through terminating ends of the first center lateral groove and the first center closed sipe and a second imaginary line passing through terminating ends of the second center lateral groove and the second center closed sipe.

17 Claims, 14 Drawing Sheets

(52) U.S. Cl.
CPC ...... *B60C 11/1236* (2013.01); *B60C 11/1307* (2013.01); *B60C 11/1384* (2013.01); *B60C 2011/0341* (2013.01); *B60C 2011/0374* (2013.01); *B60C 2011/0381* (2013.01); *B60C 2011/0383* (2013.01); *B60C 2011/1209* (2013.01); *B60C 2011/1213* (2013.01); *B60C 2011/1254* (2013.01)

(56) References Cited

U.S. PATENT DOCUMENTS

| | | | | |
|---|---|---|---|---|
| 5,012,847 | A * | 5/1991 | Fukumoto | B60C 11/0306 152/209.18 |
| 5,209,793 | A * | 5/1993 | Cusimano, II | B60C 11/0306 152/209.18 |
| 5,964,267 | A * | 10/1999 | Poque | B60C 11/13 152/209.21 |
| 6,220,321 | B1 * | 4/2001 | Yoshioka | B60C 11/0306 152/209.18 |
| D524,233 | S * | 7/2006 | Marazzi | B60C 11/0306 D12/521 |
| D826,138 | S * | 8/2018 | Yamaoka | B60C 11/11 D12/521 |
| 2001/0022209 | A1 * | 9/2001 | Chaen | B60C 11/11 152/151 |
| 2005/0016652 | A1 * | 1/2005 | Iwasaki | B60C 11/11 152/209.5 |
| 2009/0255614 | A1 * | 10/2009 | Ebiko | B60C 11/0302 152/209.8 |
| 2010/0314012 | A1 * | 12/2010 | Hada | B60C 11/0306 152/209.16 |
| 2010/0326577 | A1 * | 12/2010 | Iwai | B60C 11/0309 152/209.24 |
| 2011/0005652 | A1 * | 1/2011 | Ono | B60C 11/0309 152/209.18 |
| 2011/0005653 | A1 * | 1/2011 | Ebiko | B60C 11/0306 152/209.18 |
| 2012/0291934 | A1 | 11/2012 | Iwabuchi | |
| 2013/0153105 | A1 * | 6/2013 | Bournat | B60C 11/0309 152/209.21 |
| 2013/0186532 | A1 * | 7/2013 | Kujime | B60C 11/0304 152/209.8 |
| 2013/0192731 | A1 * | 8/2013 | Oji | B60C 11/0302 152/209.8 |
| 2014/0230980 | A1 * | 8/2014 | Guichon | B60C 11/0327 152/209.18 |
| 2014/0238563 | A1 * | 8/2014 | Tanaka | B60C 11/0306 152/209.2 |
| 2014/0238567 | A1 * | 8/2014 | Iwasaki | B60C 11/0306 152/209.18 |
| 2014/0283967 | A1 * | 9/2014 | Inoue | B60C 11/12 152/209.18 |
| 2014/0345767 | A1 * | 11/2014 | Tanaka | B60C 11/1263 152/209.22 |
| 2015/0151586 | A1 * | 6/2015 | Furusawa | B60C 11/1263 152/209.25 |
| 2016/0082780 | A1 * | 3/2016 | Nagahara | B60C 11/042 152/209.18 |
| 2016/0176235 | A1 * | 6/2016 | Takayama | B60C 11/0306 152/209.2 |
| 2016/0375728 | A1 * | 12/2016 | Kuriyama | B60C 11/0306 152/209.8 |
| 2017/0015143 | A1 * | 1/2017 | Nagase | B60C 11/0304 |
| 2017/0050470 | A1 * | 2/2017 | Kanematsu | B60C 11/0304 |
| 2017/0274708 | A1 * | 9/2017 | Suzuki | B60C 11/03 |
| 2017/0282651 | A1 * | 10/2017 | Suzuki | B60C 11/03 |
| 2018/0065417 | A1 * | 3/2018 | Hoshiba | B60C 11/01 |
| 2018/0079260 | A1 * | 3/2018 | Suzuki | B60C 11/0302 |
| 2018/0126790 | A1 * | 5/2018 | Muhlhoff | B60C 11/0306 |
| 2019/0344622 | A1 * | 11/2019 | Shimizu | B60C 11/1204 |

FOREIGN PATENT DOCUMENTS

| | | | | |
|---|---|---|---|---|
| JP | 4274355 | B2 * | 6/2009 | ........ B60C 11/1218 |
| JP | 5391262 | B2 * | 1/2014 | ........ B60C 11/1263 |
| JP | 5629283 | B2 * | 11/2014 | ............ B60C 11/04 |
| JP | 2015-168356 | A | 9/2015 | |
| WO | WO-2013048682 | A1 * | 4/2013 | ........... B60C 11/033 |
| WO | WO-2014123181 | A1 * | 8/2014 | ........ B60C 11/1263 |
| WO | WO-2018083416 | A1 * | 5/2018 | ........ B60C 11/0306 |

* cited by examiner

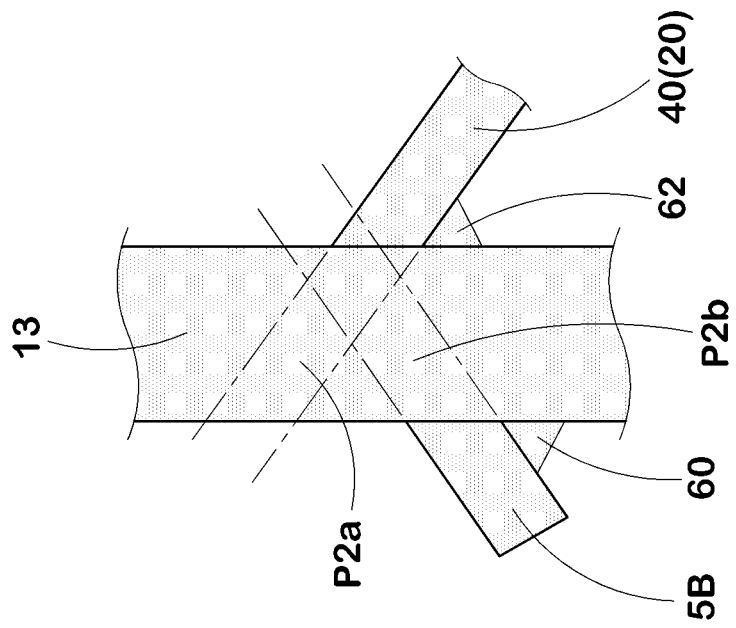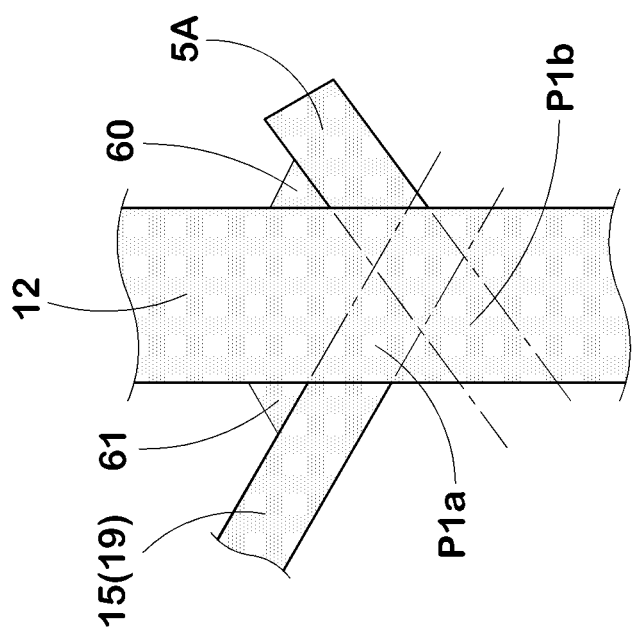
FIG.12A
FIG.12B

TIRE

TECHNICAL FIELD

The present invention relates to a tire having both running performance on a dry road surface (hereinafter referred to as "dry steering stability") and the running performance on an icy road surface (hereinafter referred to as "on-ice performance").

BACKGROUND ART

In a tire, a large number of sipes and lateral grooves are formed in a tread portion so that the on-ice performance is secured by road surface digging frictional force (edge effect) caused by edges of the sipes and the lateral grooves (see Japanese unexamined Patent Application No. 2015-168356, for example).

In order to increase the on-ice performance, formation number and length of the sipes and the lateral grooves have been increased. However, the increase in the number and the length of the sipes and the lateral grooves causes decrease of block rigidity, therefore, it is possible that the dry steering stability and the like are deteriorated, on the other hand. As just described, there is a trade-off between the on-ice performance and the dry steering stability, and further improvement is required to have them at a high level.

SUMMARY OF THE INVENTION

The present invention was made in view of the above, and a primary object thereof is to provide a tire having both the dry steering stability and the on-ice performance.

In one aspect of the present invention, a tire comprises a tread portion comprising five land regions including a center land region and divided by four main grooves extending continuously in a tire circumferential direction and including a center main groove arranged on a tire equator, wherein the center land region is divided in a plurality of center blocks by penetrating sipes crossing the center land region, each of the center blocks includes a first center lateral groove, a first center closed sipe, a second center lateral groove, and a second center closed sipe, the first center lateral groove extends from a first side edge arranged on one side in a tire axial direction of the center land region and terminates within the center block, the first center closed sipe extends from the first side edge and terminates within the center block, the second center lateral groove extends from a second side edge arranged on the other side in the tire axial direction of the center land region, terminates within the center block, and is opposed to the first center closed sipe in the tire axial direction, the second center closed sipe extends from the second side edge, terminates within the center block, and is opposed to the first center lateral groove in the tire axial direction, a length LA of the first center lateral groove is not more than half of an extended length LA0 obtained by extending the first center lateral groove to the second side edge, a length LB of the second center lateral groove is not more than half of an extended length LB0 obtained by extending the second center lateral groove to the first side edge, a length Lb of the first center closed sipe is in a range of from one third to two thirds of an extended length Lb0 obtained by extending the first center closed sipe to the second side edge, a length La of the second center closed sipe is in a range of from one third to two thirds of an extended length La0 obtained by extending the second center closed sipe to the first side edge, the length LA is smaller than the length La, a sum (LA+La) is smaller than the extended length LA0, the length LB is smaller than the length Lb, a sum (LB+Lb) is smaller than the extended length LB0, each of the center blocks includes a high rigidity region defined between a first imaginary line and a second imaginary line and extends continuously and straight between a pair of the penetrating sipes, the first imaginary line passes through a terminating end of the first center lateral groove and a terminating end of the first center closed sipe, the second imaginary line passes through a terminating end of the second center lateral groove and a terminating end of the second center closed sipe, and the high rigidity region is provided with no grooves and sipes.

In another aspect of the invention, it is preferred that the first center lateral groove, the second center lateral groove, the first center closed sipe, the second center closed sipe, and the penetrating sipes are inclined in the same direction with respect to the tire axial direction.

In another aspect of the invention, it is preferred that the first imaginary line and the second imaginary line are parallel to each other.

In another aspect of the invention, it is preferred that each of the penetrating sipes includes a first sipe portion extending from the first side edge, a second sipe portion extending from the second side edge, and a joint sipe portion connecting between the first sipe portion and the second sipe portion, and a depth of the joint sipe portion is smaller than depths of the first sipe portion and the second sipe portion.

In another aspect of the invention, it is preferred that the depth of the first sipe portion and the depth of the second sipe portion are equal and the depth of the joint sipe portion is not more than one third of a depth of the center main groove.

In another aspect of the invention, it is preferred that each of the center blocks includes a chamfered portion provided at at least one of corner parts of intersection portions where the first and second center lateral grooves each intersects with corresponding one of the main grooves.

In another aspect of the invention, it is preferred that the center main groove includes a first center main groove and a second center main groove, the land regions include a first middle land region arranged adjacently to the center land region on one side in the tire axial direction with the first center main groove therebetween, and a second middle land region arranged adjacently to the center land region on the other side in the tire axial direction with the second center main groove therebetween, each of the first middle land region and the second middle land region includes a first groove body and a second groove body each made of lateral grooves, the first groove body comprises an intersection portion where the first groove body intersects with the first center main groove and a chamfered portion provided at at least one of corner parts of the intersection portion of the first groove body, the second groove body comprises an intersection portion where the second groove body intersects with the second center main groove and a chamfered portion provided at at least one of corner parts of the intersection portion of the second groove body, an extended region obtained by extending the first groove body and an extended region obtained by extending the first center lateral groove intersect with each other within the first center main groove, and an extended region obtained by extending the second groove body and an extended region obtained by extending the second center lateral groove intersect with each other within the second center main groove.

In this specification, "sipe" and "sipe portion" mean cuts or grooves having a width not more than 1.5 mm so that opposing sipe walls thereof come into contact with each other when they are in contact with the ground.

BRIEF DESCRIPTION OF THE DRAWINGS

FIG. 12A is a conceptual diagram illustrating intersection of extended regions.
FIG. 12B is a conceptual diagram illustrating the intersection of the extended regions.

DESCRIPTION OF THE PREFERRED EMBODIMENT

Figure 1:
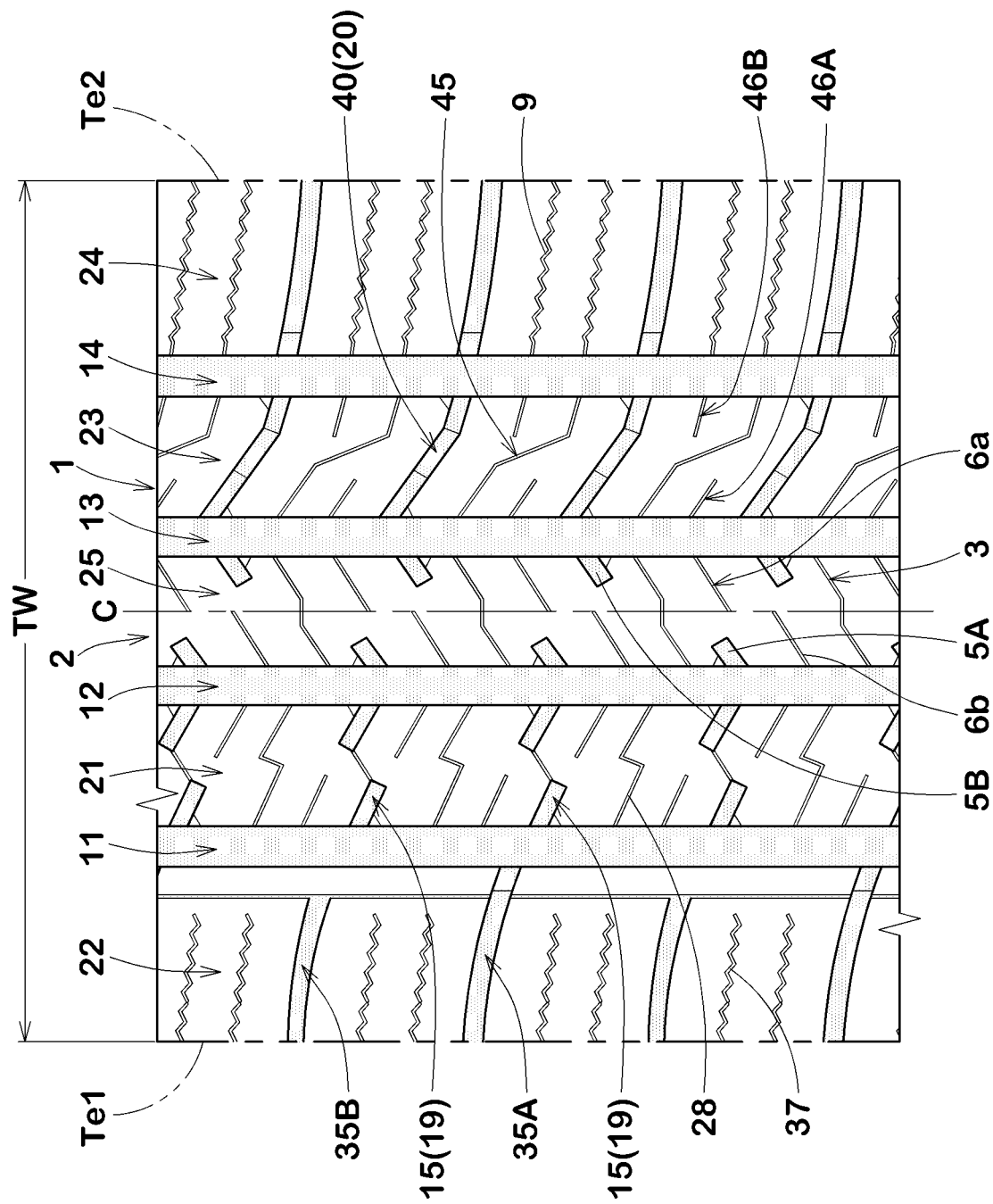
FIG. 1 is a development view of a tread portion of a tire as an embodiment of the present invention.

An embodiment of the present invention will now be described in conjunction with accompanying drawings.
FIG. 1 is a development view of a tread portion 2 of a tire 1 as an embodiment of the present invention. The tire 1 in this embodiment is used for various tires such as a pneumatic tire for a passenger car and for heavy load and a non-pneumatic tire (for example, an airless tire) which is not filled with pressurized air, for example. FIG. 1 shows the tire 1 formed as an all-season tire for a passenger car.
AS shown in FIG. 1, the tread portion 2 in this embodiment has an asymmetric tread pattern whose position when mounted on a vehicle is specified. In this embodiment, when the tire 1 is mounted on a vehicle, a first tread edge Te1 disposed on one side in a tire axial direction (on the left side in FIG. 1) is located on an outer side of the vehicle and a second tread edge Te2 disposed on the other side in the tire axial direction (on the right side in FIG. 1) is located on an inner side of the vehicle. Note that the present invention is not limited to such an embodiment, but can be applied to a tire having a tread pattern whose position when mounted on a vehicle is not specified, for example.
In the case of a pneumatic tire, the first tread edge Te1 and the second tread edge Te2 are the outermost ground contacting positions of the tire 1 in the tire axial direction when the tire 1 in a standard state is in contact with a flat surface with zero camber angle by being loaded with a standard tire load. Further, a distance in the tire axial direction between the first tread edge Te1 and the second tread edge Te2 is referred to as a tread width Tw.
The "standard state" is a state in which a tire is mounted on a standard rim, inflated to a standard pressure, and loaded with no tire load. In this specification, unless otherwise noted, dimensions and the like of various parts of the tire are values measured in the standard state.
The "standard rim" is a wheel rim specified for the concerned tire by a standard included in a standardization system on which the tire is based, for example, the "normal wheel rim" in JATMA, "Design Rim" in TRA, and "Measuring Rim" in ETRTO.
The "standard pressure" is air pressure specified for the concerned tire by a standard included in a standardization system on which the tire is based, for example, the "maximum air pressure" in 3ATMA, maximum value listed in the "TIRE LOAD LIMITS AT VARIOUS COLD INFLATION PRESSURES" table in TRA, and "INFLATION PRESSURE" in ETRTO.
The "standard load" is a tire load specified for the concerned tire by a standard included in a standardization system on which the tire is based, for example, the "maximum load capacity" in JATMA, maximum value listed in "TIRE LOAD LIMITS AT VARIOUS COLD INFLATION PRESSURES" table in TRA, and "LOAD CAPACITY" in ETRTO.
The tread portion 2 is provided with four main grooves extending continuously in a tire circumferential direction. The four main grooves include a first center main groove 12 and a first shoulder main groove 11 arranged between a tire equator C and the first tread edge Te1 and a second center main groove 13 and a second shoulder main groove 14 arranged between the tire equator C and the second tread edge Te2.
It is preferred that the first shoulder main groove 11 and the second shoulder main groove 14 are arranged such that groove center lines thereof are each spaced away from the tire equator c by a distance in a range of from 0.20 to 0.35 times the tread width TW, for example. It is preferred that the first center main groove 12 and the second center main groove 13 are arranged such that groove center lines thereof are each spaced away from the tire equator C by a distance in a range of from 0.05 to 0.15 times the tread width TW, for example.
It is preferred that a groove width of each of the main grooves 11 to 14 is in a range of from 3% to 7% of the tread width Tw, for example. It is preferred that a groove depth of each of the main grooves 11 to 14 is in about a range of from 5 to 10 mm in the case of a tire for a passenger car, for example. Note that the dimensions of each of the main grooves 11 to 14 are not limited to such ranges.
The tread portion 2 is provided with a plurality of land regions divided by the main grooves 11 to 14. Specifically, the plurality of the land regions includes a center land region 25, a first middle land region 21, a second middle land region 23, a first shoulder land region 22, and a second shoulder land region 24.
The center land region 25 is arranged on the tire equator C. The first middle land region 21 is adjacent to the center land region 25 on the one side (outer side of the vehicle) in the tire axial direction with the first center main groove 12 therebetween. The first shoulder land region 22 is adjacent to the first middle land region 21 on the one side (outer side of the vehicle) in the tire axial direction with the first shoulder main groove 11 therebetween. The second middle land region 23 is adjacent to the center land region 25 on the other side (inner side of the vehicle) in the tire axial direction with the second center main groove 13 therebetween. The second shoulder land region 24 is adjacent to the second middle land region 23 on the other side (inner side of the vehicle) in the tire axial direction with the second shoulder main groove 14 therebetween.

Figure 2:
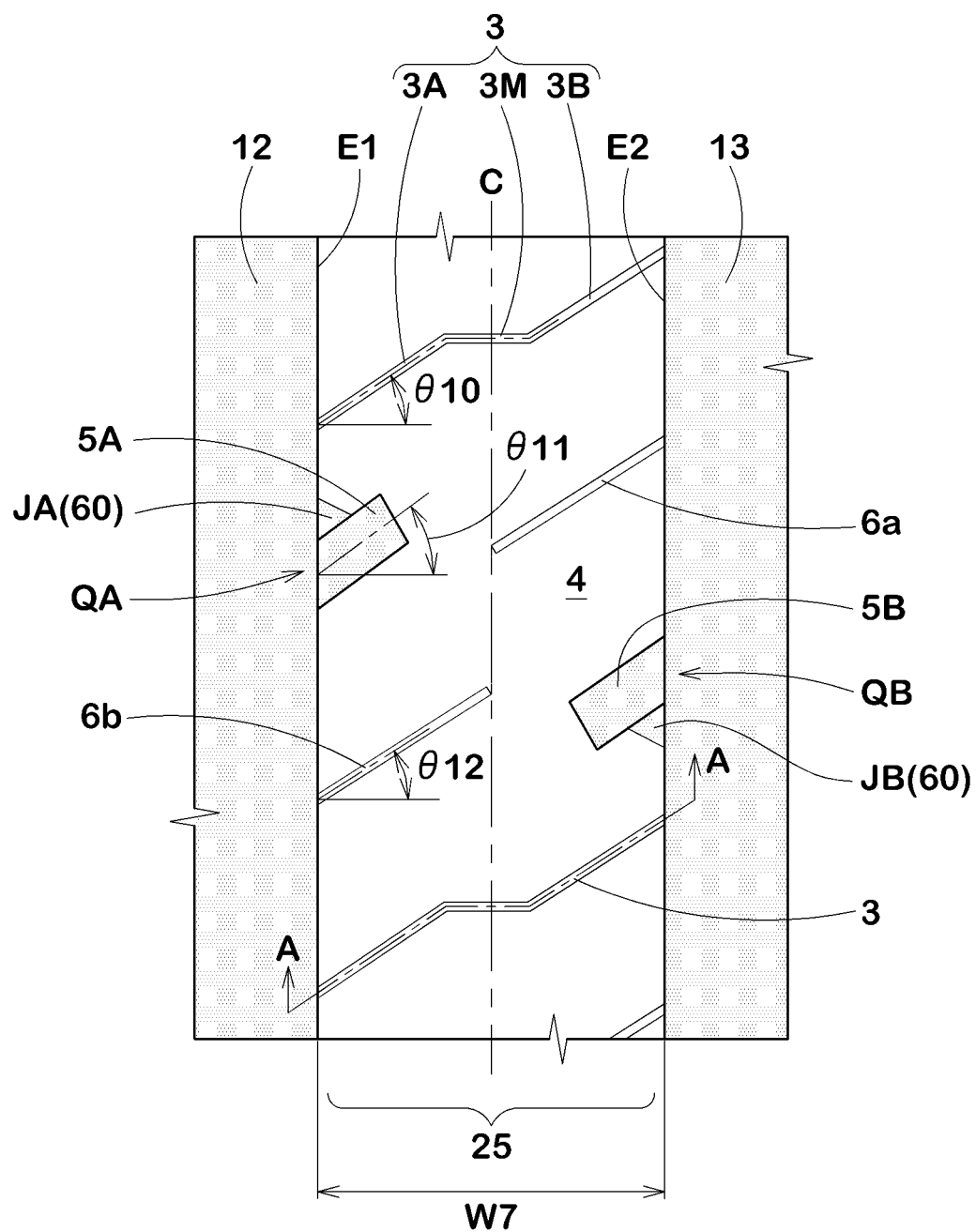
FIG. 2 is an enlarged view of a center land portion.

FIG. 2 is an enlarged view of the center land region 25. As shown in FIG. 2, the center land region 25 is divided into a plurality of center blocks 4 by penetrating sipes 3 crossing the center land region 25. It is preferred that a width w7 in the tire axial direction of the center land region 25 is in a range of from 0.10 to 0.15 times the tread width Tw, for example.

Each of the penetrating sipes 3 includes a first sipe portion 3A extending from a first side edge E1 arranged on the one side in the tire axial direction of the center land region 25 and a second sipe portion 3B extending from a second side edge E2 arranged on the other side in the tire axial direction of the center land region 25 and a joint sipe portion 3M connecting between the first sipe portion 3A and the second sipe portion 3B.

In this embodiment, the first sipe portion 3A, the joint sipe portion 3M, and the second sipe portion 3B are connected in a bent manner in a crank shape. The crank-shaped penetrating sipes 3 are preferred for securing rigidity of the center land region 25, because opposing sipewalls of the penetrating sipes engage with each other in a crank shape when a load is applied to them. Further, lengths of edge components are increased in the tire circumferential direction and the tire axial direction, therefore, it is possible to contribute to improvement in on-ice/on-snow performance.

The first sipe portion 3A and the second sipe portion 3B are inclined in the same direction with respect to the tire axial direction. It is preferred that an angle θ10 with respect to the tire axial direction of each of the first sipe portion 3A and the second sipe portion 3B is in a range of from 30 to 40 degrees, for example, in order to exert edge effect in a good balance in the tire axial direction and the tire circumferential direction. Further, it is preferred that the joint sipe portion 3M extends at an angle not more than 5 degrees with respect to the tire axial direction, that is, extends substantially along the tire axial direction, for straight running stability.

Figure 5:
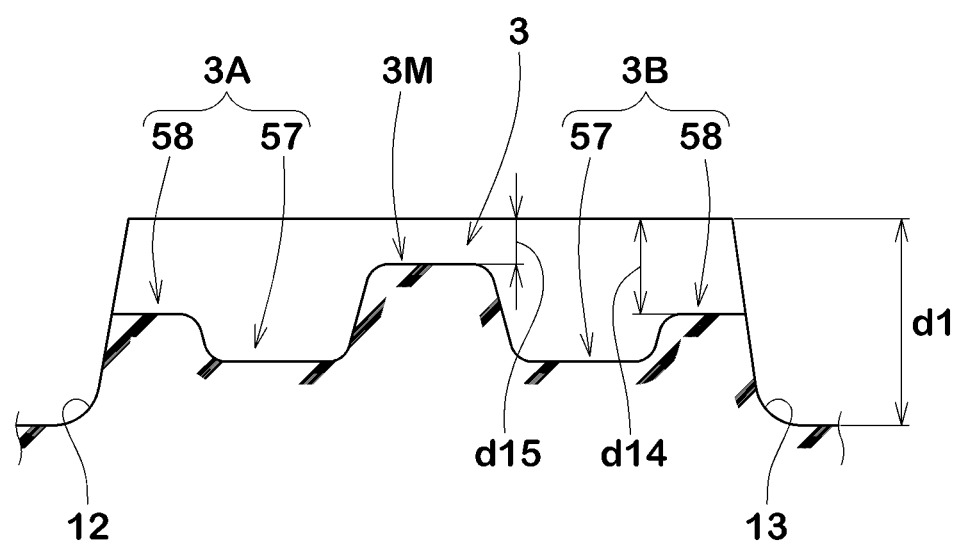
FIG. 5 is a cross-sectional view taken along A-A line of FIG. 2.

FIG. 5 is a cross-sectional view of one of the penetrating sipes 3 taken along line A-A of FIG. 2. As shown in FIG. 5, in each of the penetrating sipes 3 in this embodiment, a depth d15 of the joint sipe portion 3M is smaller than a minimum depth d14 of the first sipe portion 3A and the second sipe portion 3B. Thereby, it is possible that rigidity decrease of the center land region 25 caused by the penetrating sipes 3 is suppressed. For this reason, it is preferred that the depth d15 of the joint sipe portion 3M is not more than one third of a depth d1 of the first center main groove 12 and the second center main groove 13. Further, from the point of view of rigidity balance, it is preferred that the minimum depths d14 of the first sipe portion 3A and the second sipe portion 3B are equal to each other.

Each of the first sipe portion 3A and the second sipe portion 3B in this embodiment includes a deep bottom portion 57 and a shallow bottom portion 58 having a smaller depth than that of the deep bottom portion 57. The shallow bottom portion 58 is arranged at each end portion in the tire axial direction of the penetrating sipe 3, for example. The deep bottom portion 57 is arranged between each of the shallow bottom portions 58 and the joint sipe portion 3M, for example. In this embodiment, the depths of the shallow bottom portions 58 correspond to the minimum depths d14 of the first sipe portion 3A and the second sipe portion 3B.

As shown in FIG. 2, each of the center blocks 4 is provided with a first center lateral groove 5A, a second center lateral groove 5B, a first center closed sipe 6b, and a second center closed sipe 6a.

Each of the first center lateral groove 5A and the first center closed sipe 6b extends from the first side edge E1 toward the second side edge E2 and terminates within the center block 4. Further, each of the second center lateral groove 5B and the second center closed sipe 6a extends from the second side edge E2 toward the first side edge E1 and terminates within the center block 4.

Furthermore, the first center lateral groove 5A and the second center closed sipe 6a are opposed to each other in the tire axial direction. Yet furthermore, the second center lateral groove 5B and the first center closed sipe 6b are opposed to each other in the tire axial direction.

Here, the first center lateral groove 5A and the second center closed sipe 6a being "opposed to each other" in the tire axial direction means that at least a part of the first center lateral groove 5A and at least a part of the second center closed sipe 6a face each other in the tire axial direction (overlap each other when viewed in the tire axial direction). Further, the second center lateral groove 5B and the first center closed sipe 6b being "opposed to each other" in the tire axial direction means that at least a part of the second center lateral groove 5B and at least a part of the first center closed sipe 6b face each other in the tire axial direction (overlap each other when viewed in the tire axial direction). By an arrangement configured as such, the lateral grooves and the closed sipes are distributedly arranged, therefore, it is possible that the block rigidity is made uniform.

Here, it is preferred that the first center lateral groove 5A, the second center lateral groove 5B, the first center closed sipe 6b, and the second center closed sipe 6a are inclined in the same direction with respect to the tire axial direction as the first sipe portions 3A and the second sipe portions 3B of the penetrating sipes 3. By having them inclined in the same direction as described above, the block rigidity is made further uniform.

It is preferred that an angle θ11 with respect to the tire axial direction of each of the first center lateral groove 5A and the second center lateral groove 5B is in a range of from 30 to 40 degrees, for example, in order to exert edge effect in a good balance in the tire axial direction and the tire circumferential direction. It is particularly preferred that the first center lateral groove 5A and the second center lateral groove 5B are parallel to each other.

It is preferred that an angle θ12 with respect to the tire axial direction of each of the first center closed sipe 6b and the second center closed sipe 6a is in a range of from 30 to 40 degrees, for example, in order to exert edge effect in a good balance in the tire axial direction and the tire circumferential direction. It is particularly preferred that the first center closed sipe 6b and the second center closed sipe 6a are parallel to each other.

Each of the center blocks 4 includes an intersection portion QA where the first center lateral groove 5A intersects with the first center main groove 12. A chamfered portion 60 is provided at at least one of corner parts, particularly at a corner part JA on a sharp-angled side, of the intersection portion QA. Similarly, each of the center blocks 4 includes an intersection portion QB where the second center lateral groove 5B intersects with the second center main groove 13, and the chamfered portion 60 is provided at at least one of corner portions, particularly at a corner part 3B on a sharp-angled side, of the intersection portion QB. When running on a snowy road surface, the chamfered portions 60 increase connection strength between a snow block in the first center main groove 12 and a snow block in the first center lateral groove 5A, and connection strength between a snow block in the second center main groove 13 and a snow block in the second center lateral groove 58B. Thereby, effect of increasing snow shearing force is exerted.

Figure 3A:
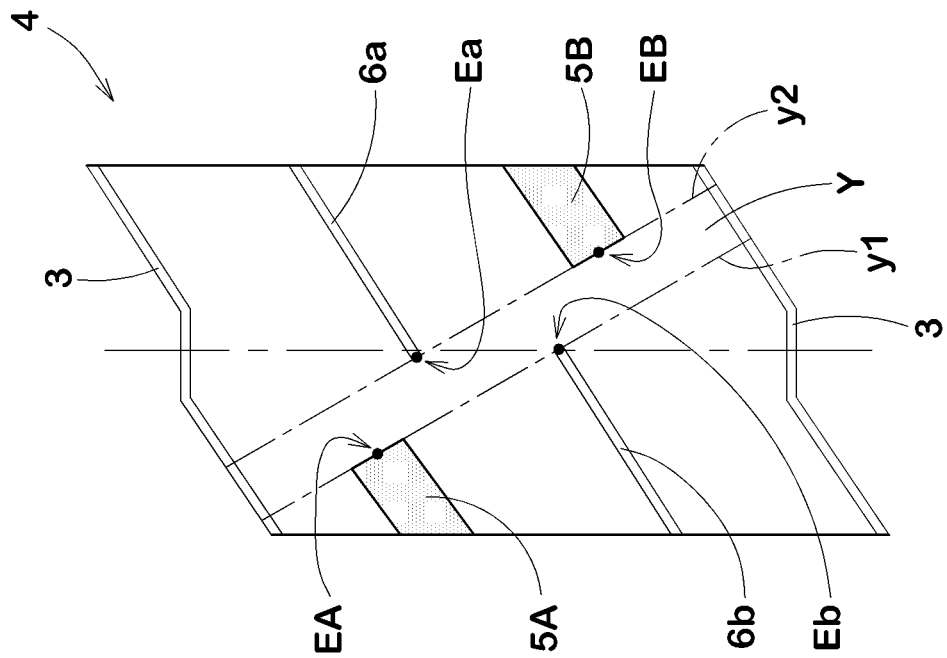
FIG. 3A is an enlarged view of a center block.

As shown in FIG. 3A, (a) A length LA of the first center lateral groove 5A is not more than half of an extended length LA0 obtained by extending the first center lateral groove 5A to the second side edge E2.

(b) A length LB of the second center lateral groove 5B is not more than half of an extended length LB0 obtained by extending the second center lateral groove 5B to the first side edge E1.

(c) A length Lb of the first center closed sipe 6b is in a range of from one third to two thirds of an extended length Lb0 obtained by extending the first center closed sipe 6b to the second side edge E2.

(d) A length La of the second center closed sipe 6a is in a range of from one third to two thirds of an extended length La0 obtained by extending the second center closed sipe 6a to the first side edge E1.

(e) The length LA is smaller than the length La and a sum (LA+La) is smaller than the extended length LA0.

(f) The length LB is smaller than the length Lb and a sum (LB+Lb) is smaller than the extended length LB0.

Each of the length LA, LA0, LB, LB0, La, La0, Lb, and Lb0 is a length at a groove center or a sipe center along a longitudinal direction of corresponding groove or sipe.

Figure 3B:
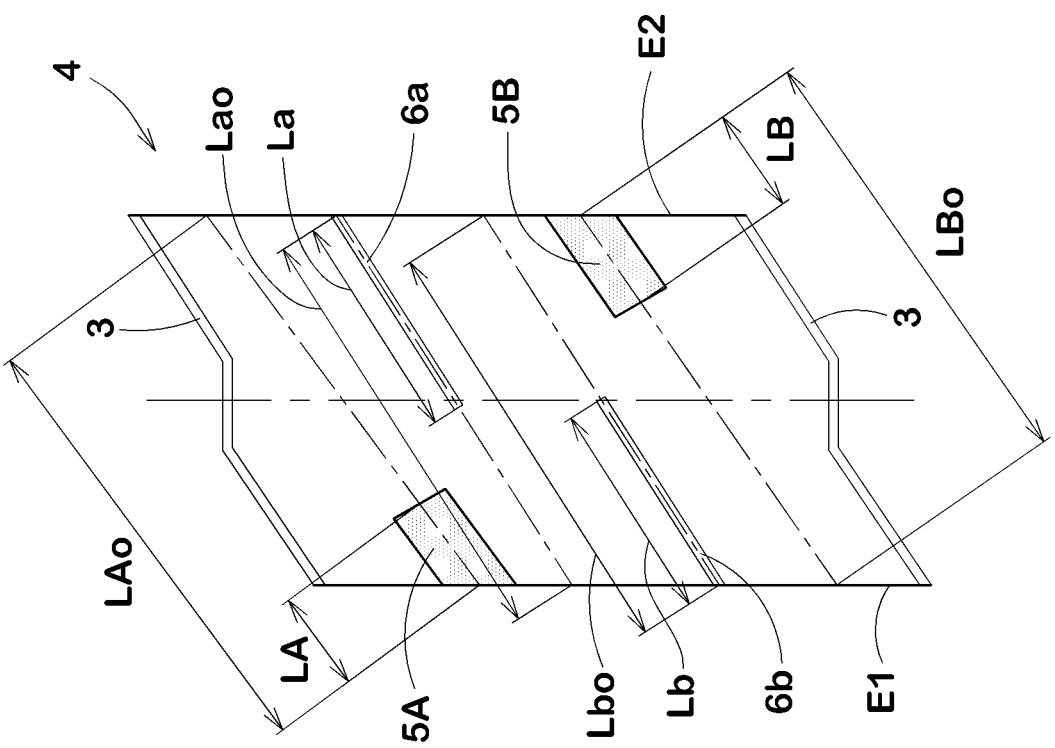
FIG. 3B is an enlarged view of the center block.

Further, as shown in FIG. 3B, each of the center blocks 4 includes a strip-shaped high rigidity region Y defined between a first imaginary line y1 and a second imaginary line y2 and extending continuously and straight between a pair of the penetrating sipes 3. The first imaginary line y1 is defined as a straight line passing through a terminating end EA of the first center lateral groove 5A and a terminating end Eb of the first center closed sipe 6b. Further, the second imaginary line y2 is defined as a straight line passing through a terminating end EB of the second center lateral groove 5B and a terminating end Ea of the second center closed sipe 6a. Note that the terminating ends EA, EB, Ea, and Eb are specified at the center of the groove width or the center of the sipe width, respectively.

The high rigidity region Y shows high elasticity by not having grooves and sipes. Thereby, it is possible to suppress decrease of the block rigidity by having the high rigidity region Y while improving the on-ice performance by increasing edge length by the lengths LA, LB, La, and Lb. That is, it is possible to exert both the on-ice performance and the dry steering stability at a high level.

This effect is achieved by satisfying the above conditions (a) to (f). For example, formation of the high rigidity region Y becomes difficult, and thus the effect of suppressing the decrease of the block rigidity is not exerted in the following conditions: when the Length LA is more than half of the extended length LA0, when the Length LB is more than half of the extended length LB0, when the length Lb is more than two thirds of the extended length Lb0, and when the length La is more than two thirds of the extended length La0. Further, the formation of the high rigidity region Y becomes difficult as well when the sum (LA+La) is more than the extended length LA0 and when the sum (LB+Lb) is more than the extended length LB0.

Conversely, when the length Lb is less than one third of the extended length Lb0 and when the length La is less than one third of the extended length La0, the edge length becomes insufficient, therefore, the on-ice performance cannot be sufficiently secured. Further, when the length LA is not less than the length La and when the length LB is not less than the length Lb, the edge length becomes insufficient or the block rigidity is decreased.

Figure 4A:
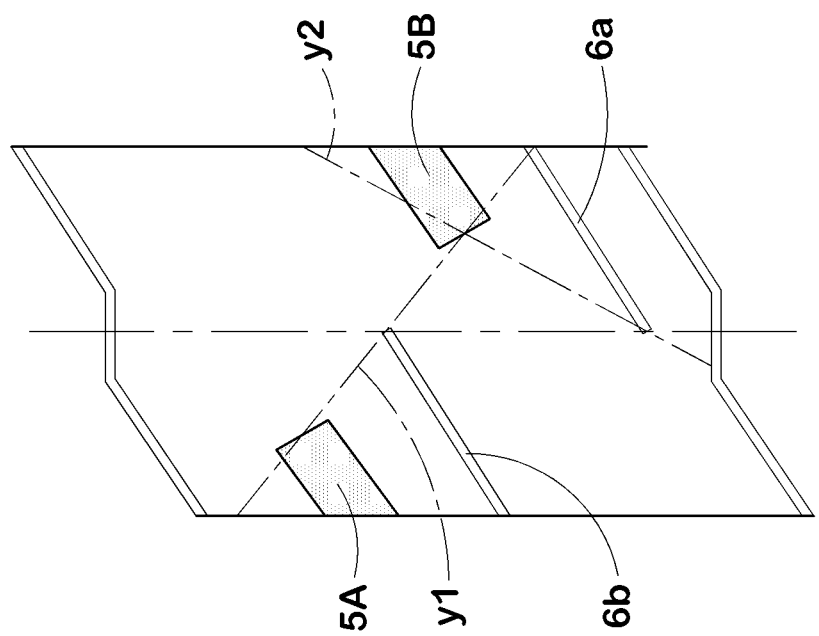
FIG. 4A is an enlarged view of a reference example of the center block.
Figure 4B:
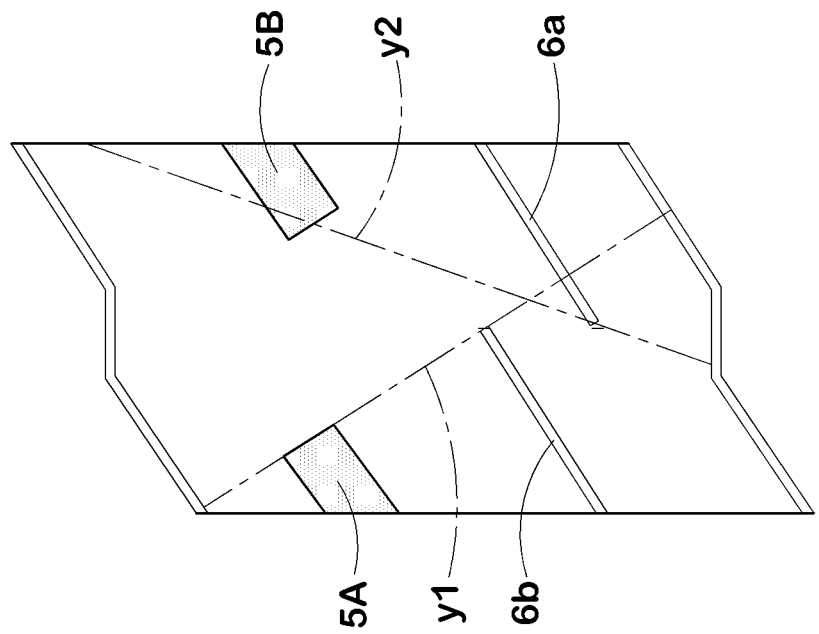
FIG. 4B is an enlarged view of the reference example of the center block.

Furthermore, FIGS. 4A and 4B show examples in which the lengths LA, LB, La and Lb are the same as those of the center block 4 in FIG. 3 but the high rigidity region Y is not formed and therefore the block rigidity is largely decreased. In the example shown in FIG. 4A, the first center lateral groove 5A and the second center closed sipe 6a are not opposed to each other and the first center closed sipe 6b and the second center lateral groove 5B are not opposed to each other, whereby the high rigidity region Y is not formed, for example. In the example shown in FIG. 4B, the first center lateral groove 5A and the second center closed sipe 6a are not opposed to each other, whereby the high rigidity region Y is not formed, for example.

In the high rigidity region Y, it is preferred that the first imaginary line y1 and the second imaginary line y2 are parallel to each other. Further, it is preferred that the high rigidity region Y is inclined in a direction different from the first center lateral groove 5A and the second center lateral groove 5B with respect to the tire axial direction.

Figure 6:
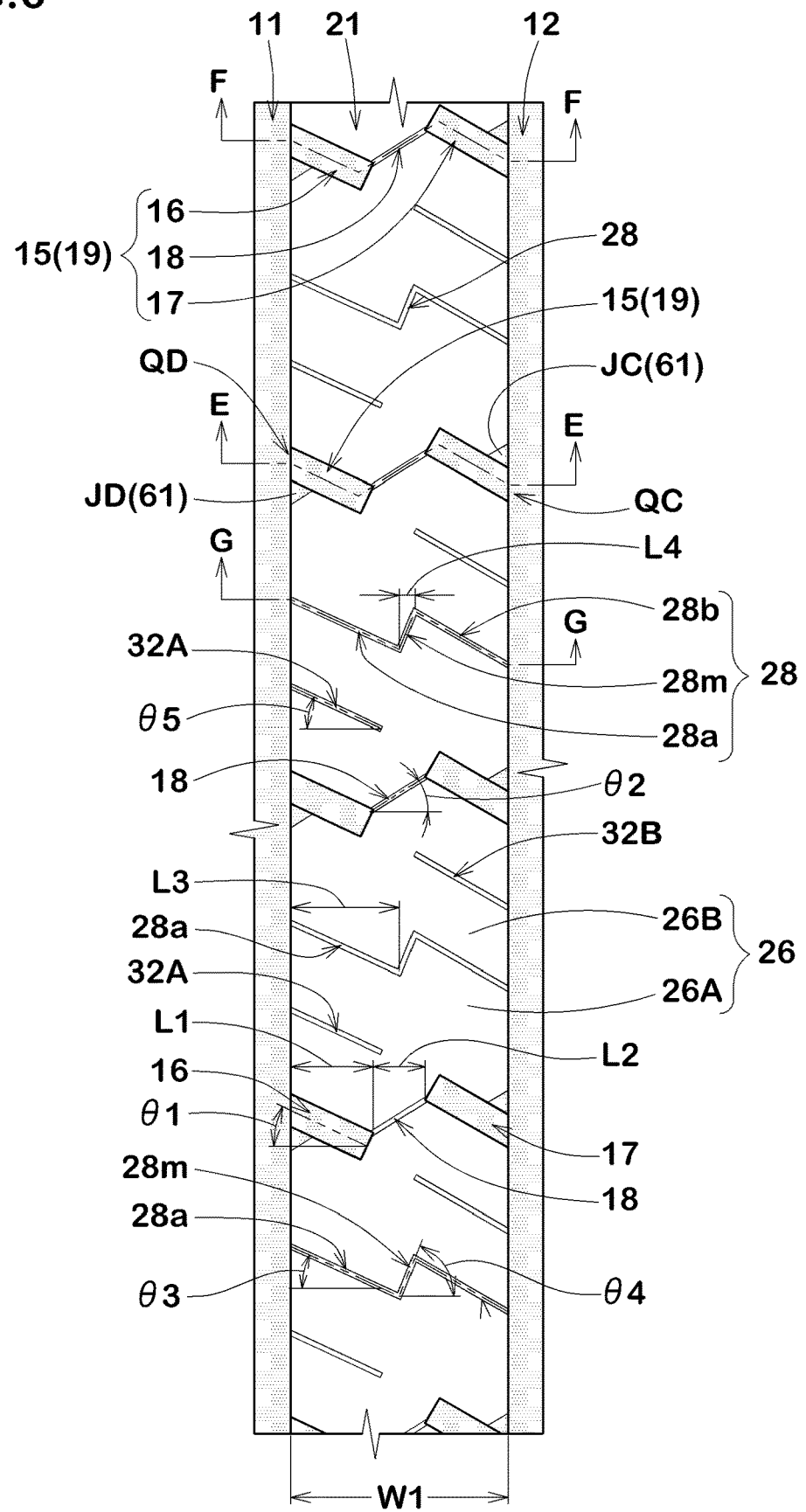
FIG. 6 is an enlarged view of a first middle land region.

FIG. 6 is an enlarged view of the first middle land region 21. As shown in FIG. 6, it is preferred that a width w1 in the tire axial direction of the first middle land region 21 is in a range of from 0.15 to 0.25 times the tread width TW.

The first middle land region 21 is provided with first groove bodies 19 each made of lateral grooves and intersecting the first center main groove 12.

Each of the first groove bodies 19 in this embodiment is formed as a middle lateral groove 15 having a crank-like shape.

The middle lateral groove 15 (first groove body 19) includes a first lateral groove portion 16, a second lateral groove portion 17, and a sipe portion 18. The first lateral groove portion 16 extends from the first shoulder main groove 11 and is inclined with respect to the tire axial direction. The second lateral groove portion 17 extends from the first center main groove 12 and is inclined in the same direction as the first lateral groove portion 16. The sipe portion 18 extends so as to connect between the first lateral groove portion 16 and the second lateral groove portion 17 and is inclined in the opposite direction to the first lateral groove portion 16.

The middle lateral groove 15 includes the sipe portion 18, therefore, it is possible to prevent decrease in the rigidity of the first middle land region 21, thereby, it is possible to contribute to improvement in the dry steering stability. Further, the first lateral groove portion 16 and the second lateral groove portion 17 exert snow shearing force during running on snow, therefore, it is possible to contribute to improvement in on-snow performance. Furthermore, in the middle lateral groove 15, the sipe portion 18 is inclined in the opposite direction to the first lateral groove portion 16 and the second lateral groove portion 17, therefore, edge component in the tire circumferential direction and the tire axial direction is increased, thereby, the on-ice performance is improved.

Further, at an intersection portion QC where each of the middle lateral grooves 15 intersects with the first center main groove 12, a chamfered portion 61 is provided at at least one of corner parts at the intersection portion QC (particularly, a corner part 3c on a sharp-angled side). In this embodiment, the chamfered portion 61 is also provided at at least one of the corner parts (particularly at a corner part 3D on a sharp-angled side) at an intersection portion QD where each of the middle lateral grooves 15 intersects with the first shoulder main groove 11. When running on a snowy road, each of the chamfered portions 61 increases the connection strength between snow blocks in the first center main groove 12 and snow blocks in the middle lateral groove 15, and the connection strength between snow blocks in the first shoulder main groove 11 and snow blocks in the middle lateral groove 15, therefore, the snow shearing force is increased.

It is preferred that an angle θ1 of each of the first lateral groove portion 16 and the second lateral groove portion 17 with respect to the tire axial direction is in a range of from 20 to 30 degrees, for example.

It is preferred that the first lateral groove portion 16 and the second lateral groove portion 17 terminate before reaching a center position in the tire axial direction of the first middle land region 21, for example. It is preferred that a length L1 in the tire axial direction of each of the first lateral groove portion 16 and the second lateral groove portion 17 is in a range of from 0.30 to 0.40 times the width w1 of the first middle land region 21, for example.

It is preferred that an angle θ2 of the sipe portion 18 with respect to the tire axial direction is in a range of from 25 to 40 degrees, for example. It is preferred that a length L2 in the tire axial direction of the sipe portion 18 is preferably smaller than the length L1 of the first lateral groove portion 16 and the second lateral groove portion 17, and it is particularly preferred that the length L2 is in a range of from 0.65 to 0.75 times the length L1.

Figure 7A:
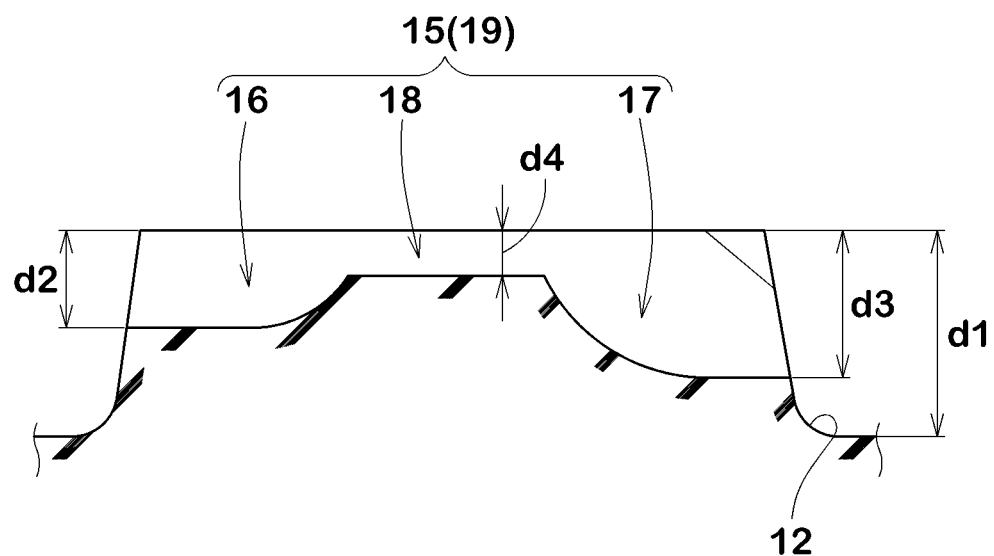
FIG. 7A is a cross-sectional view taken along E-E line of FIG. 6.
Figure 7B:
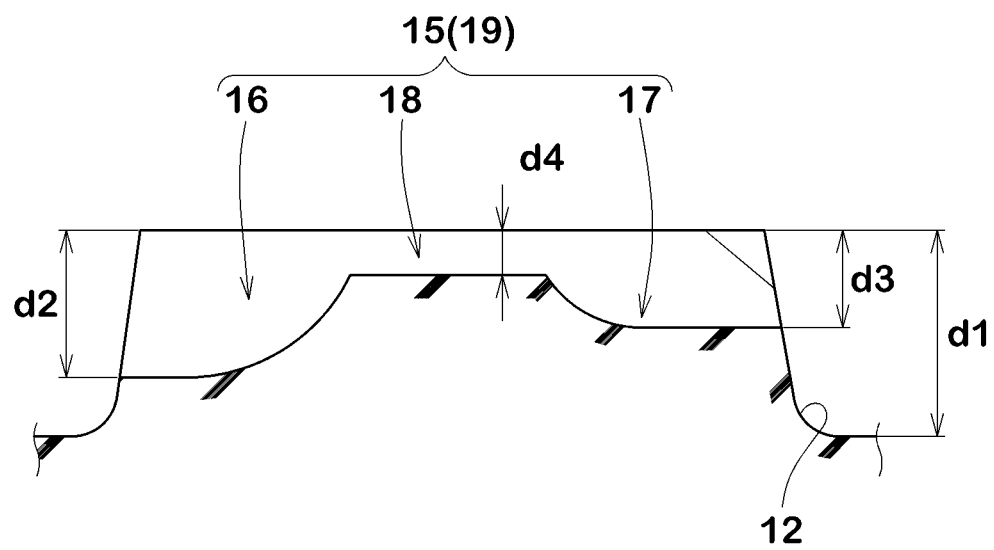
FIG. 7B is a cross-sectional view taken along F-F line of FIG. 6.

FIG. 7A is a cross-sectional view of one of the middle lateral grooves 15 taken along E-E line in FIG. 6, and FIG. 7B is a cross-sectional view, taken along F-F line, of another one of the middle lateral grooves 15 adjacent in the tire circumferential direction to the middle lateral groove 15 shown in FIG. 7A. As shown in FIGS. 7A and 7B, it is preferred that the first lateral groove portion 16 has a different depth from the second lateral groove portion 17, for example.

In this embodiment, the middle lateral groove 15 (shown in FIG. 7A) in which the first lateral groove portion 16 has a smaller depth than the second lateral groove portion 17 and the middle lateral groove 15 (shown in FIG. 7B) in which the second lateral groove portion 17 has a smaller depth than the first lateral groove portion 16 are arranged alternately in the tire circumferential direction. In such an embodiment, it is possible that the first middle land region 21 is uniformly worn. Further, such arrangement of the lateral groove portions is likely to cause irregular deformation of the first middle land region 21, therefore, it is useful for discharging snow in the lug groove portions.

It is preferred that a depth d2 of the first lateral groove portion 16 and a depth d3 of the second lateral groove portion 17 are in a range of from 0.45 to 0.75 times the depth d1 of the first center main groove 12, for example. It is preferred that a ratio d2/d3 of the depth d2 and the depth d3 is in a range of from 0.6 to 1.8, for example.

The sipe portion 18 has a constant depth d4, and it is preferred that the depth d4 is in a range of from 0.15 to 0.25 times the depth d1 of the first center main groove 12, for example.

As shown in FIG. 6, the first middle land region 21 includes a plurality of middle blocks 26 divided by the plurality of the middle lateral grooves 15. Each of the middle blocks 26 is provided with a crank-shaped middle sipe 28 crossing the first middle land region 21.

The crank-shaped middle sipe 28 includes an outer inclined portion 28a, an inner inclined portion 28b, and a middle inclined portion 28m, for example.

The outer inclined portion 28a extends from the first shoulder main groove 11 and is inclined in the same direction as the first lateral groove portion 16 and the second lateral groove portion 17. The inner inclined portion 28b extends from the first center main groove 12 and is inclined in the same direction as the outer inclined portion 28a. The middle inclined portion 28m is inclined in the opposite direction to the inner inclined portion 28b and the outer inclined portion 28a and extends so as to connect between the inner inclined portion 28b and the outer inclined portion 28a.

Similar to middle sipes 45 (shown in FIG. 11) described later, crank-shaped middle sipes 28 increase edge component in the tire circumferential direction and the tire axial direction, therefore, the on-ice performance is improved. Further, opposing walls of each of the sipes engage with each other in a crank shape, therefore, the block rigidity is maintained high even when the crank-shaped middle sipes 28 are configured to cross the land region.

It is preferred that an angle θ3 of each of the inner inclined portions 28b and the outer inclined portions 28a with respect to the tire axial direction is in a range of from 20 to 30 degrees, for example. It is preferred that a length L3 of each of the inner inclined portions 28b and the outer inclined portions 28a in the tire axial direction is larger than the length L1 of the first lateral groove portion 16 and the second lateral groove portion 17. It is particularly preferred that the length L3 is in a range of from 0.45 to 0.55 times the width W1 of the first middle land region 21.

It is preferred that the middle inclined portions 28m overlaps the sipe portions 18 in the tire axial direction when viewed in the tire circumferential direction. Thereby, uneven wear of the first middle land region 21 is suppressed.

It is preferred that each of the middle inclined portions 28m is inclined at an angle 64 larger than each of the sipe portion 18 with respect to the tire axial direction, for example. It is particularly preferred that the angle θ4 with respect to the tire axial direction of each of the middle inclined portions 28m is in a range of from 65 to 75 degrees.

It is preferred that each of the middle inclined portions 28m has a length L4 in the tire axial direction smaller than that of each of the sipe portions 18. It is preferred that the length L4 of each of the middle inclined portions 28m is in a range of from 0.05 to 0.15 times the width w1 of the first middle land region 21, for example.

Figure 8:
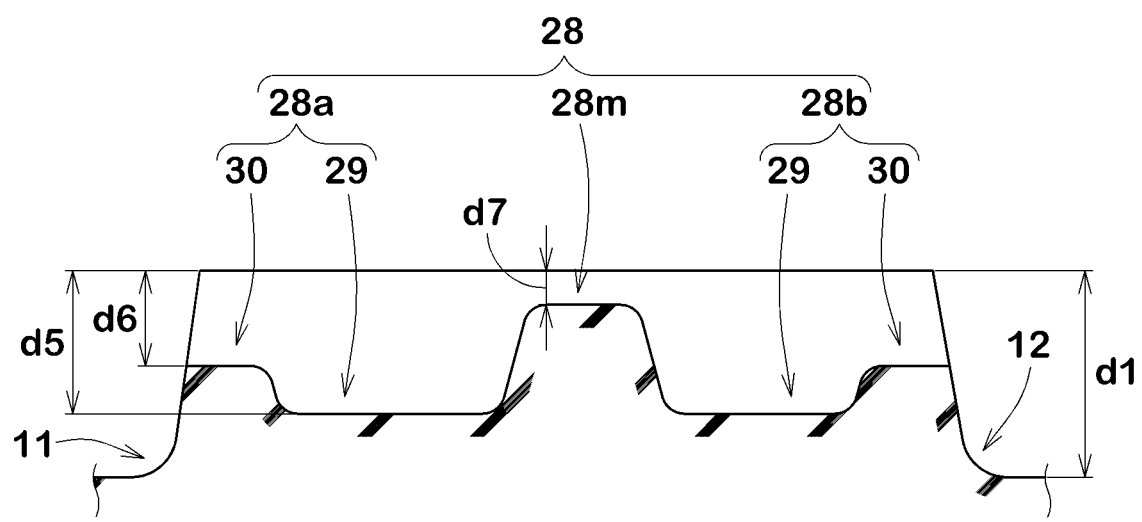
FIG. 8 is a cross-sectional view taken along G-G line of FIG. 6.

FIG. 8 is a cross-sectional view of one of the hook-shaped middle sipes 28 of FIG. 6 taken along line G-G. As shown in FIG. 8, each of the outer inclined portions 28a and the inner inclined portions 28b includes a deep bottom portion 29 and a shallow bottom portion 30 having a depth smaller than the deep bottom portion 29. Each of the shallow bottom portions 30 is formed at an end in the tire axial direction of one of the crank-shaped middle sipes 28, for example. The deep bottom portions 29 are each formed between one of the shallow bottom portions 30 and the middle inclined portion 28m of each of the hook-shaped middle sipes 28, for example. The crank-shaped middle sipes 28 configured as such maintain rigidity of the first middle land region 21 at a high level by the middle inclined portions 28m and the shallow bottom portions 30.

It is preferred that a depth d5 of each of the deep bottom portions 29 is in a range of from 0.65 to 0.75 times the depth d1 of the first center main groove 12. It is preferred that a depth d6 of each of the shallow bottom portions 30 is in a range of from 0.60 to 0.70 times the depth d5 of each of the deep bottom portions 29.

It is preferred that each of the middle inclined portions 28m has a depth d7 smaller than those of each of the outer inclined portions 28a and each of the inner inclined portions 28b, for example. It is preferred that the depth d7 of each of the middle inclined portions 28m is in a range of from 0.20 to 0.30 times the depth dS of the deep bottom portion 29 of each of the outer inclined portions 28a, for example. Further, it is preferred that the depth d7 of each of the middle inclined portions 28m is not more than 0.30 times the depth d1 of the first center main groove 12.

As shown in FIG. 6, each of the middle blocks 26 is divided into a first block piece 26A and a second block piece 26B by one of the crank-shaped middle sipes 28. In each of the middle blocks 26, the first block piece 26A is arranged on one side (lower side in FIG. 6) in the tire circumferential direction of the crank-shaped middle sipe 28 and the second block piece 26B is arranged on the other side (upper side in FIG. 6) in the tire circumferential direction of the crank-shaped middle sipe 28, for example. Each of the first block pieces 26A is provided with a closed sipe 32A and each of the second block pieces 26B is provided with a closed sipe 32B. Each of the closed sipes 32A and 32B has one end terminating within corresponding one of the first and second block pieces 26A and 26B.

In each of the middle blocks 26, the closed sipe 32A provided in the first block piece 26A extends from the first shoulder main groove 11 and is inclined in the same direction as the outer inclined portion 28a. In each of the middle blocks 26, the closed sipe 32B provided in the second block piece 26B extends from the first center main groove 12 and is inclined in the same direction as the inner inclined portion 28b. The closed sipes 32A and 32B improve the on-ice performance by edges thereof while maintaining the rigidity of the first middle land region 21.

It is preferred that, in each of the middle blocks 26, the closed sipe 32A is arranged on an extension of the second lateral groove portion 17. Further, it is preferred that, in each of the middle blocks 26, the closed sipe 32B is arranged on an extension of the first lateral groove portion 16. Such an arrangement of the closed sipes 32A and 32B moderately promotes shearing deformation in the tire circumferential direction of the middle blocks 26, therefore, it is advantageous for suppressing snow clogging in the middle lateral grooves 15.

It is preferred that an angle θ5 of each of the closed sipes 32A and 32B with respect to the tire axial direction is in a range of from 20 to 30 degrees, for example. In particular, in each of the middle blocks, it is preferred that each of the closed sipes 32A and 32B extends substantially in parallel with the outer inclined portion 28a or the inner inclined portion 28b of the crank-shaped middle sipe 28.

Figure 9:
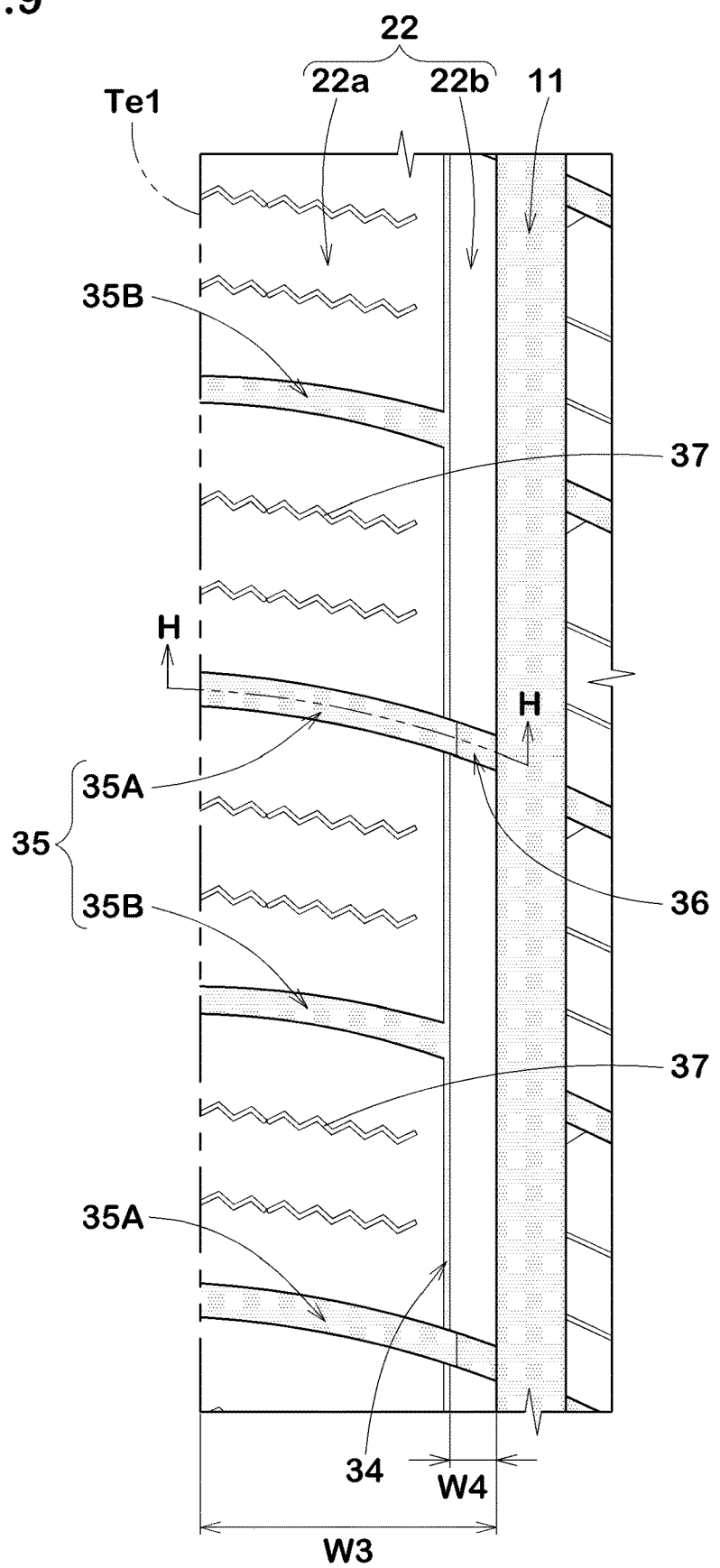
FIG. 9 is an enlarged view of a first shoulder land region.

FIG. 9 is an enlarged view of the first shoulder land region 22. It is preferred that a width w3 in the tire axial direction of the first shoulder land region 22 is in a range of from 0.15 to 0.30 times the tread width TW.

AS shown in FIG. 9, the first shoulder land region 22 is divided by a circumferential sipe 34 extending along the first shoulder main groove 11 into a main portion 22a arranged on a side of the first tread edge Tel and a narrow portion 22b arranged on a side of the first shoulder main groove 11. A width w4 in the tire axial direction of the narrow portion 22b is in a range of from 0.10 to 0.20 times the width w3 of the first shoulder land region 22, for example.

The first shoulder land region 22 is provided with a plurality of shoulder lateral grooves 35. The shoulder lateral grooves 35 include first shoulder lateral grooves 35A extending so as to connect between the first tread edge Tel and the first shoulder main groove 11 and second shoulder lateral grooves 35B extending so as to connect between the first tread edge Tel and the circumferential sipe 34. The first shoulder lateral grooves 35A and the second shoulder lateral grooves 35B are arranged alternately in the tire circumferential direction.

Figure 10:
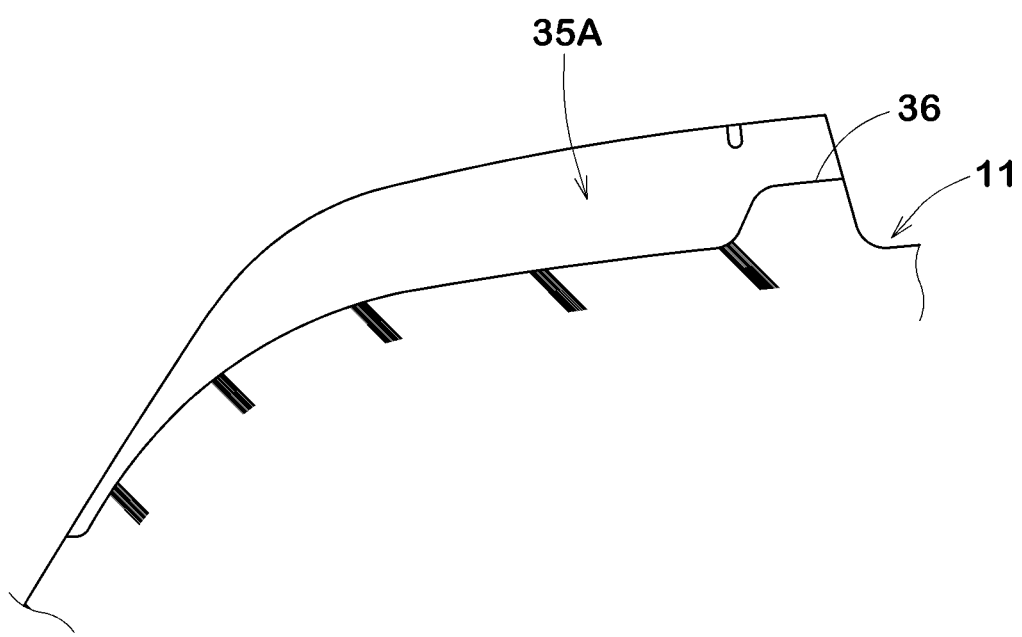
FIG. 10 is a cross-sectional view taken along H-H line of FIG. 9.

FIG. 10 is a cross-sectional view of one of the first shoulder lateral grooves 35A taken along H-H line of FIG. 9. AS shown in FIG. 10, each of the first shoulder lateral grooves 35A is provided with a tie bar 36 formed by partially raising a bottom surface thereof at an inner end portion thereof. Thereby, rigidity of the first shoulder land region 22 is maintained high.

The second shoulder lateral grooves 35B maintain the rigidity of the first shoulder land region 22 high by inner ends thereof terminating within the first shoulder land region 22.

Shoulder sipes 37 extending in a zigzag manner in the tire axial direction are each provided between a pair of the first shoulder lateral groove 35A and the second shoulder lateral groove 35B adjacent to each other. The shoulder sipes 37 maintain the rigidity of the first shoulder land region 22 high by inner ends thereof terminating within the main portion 22a.

Figure 11:
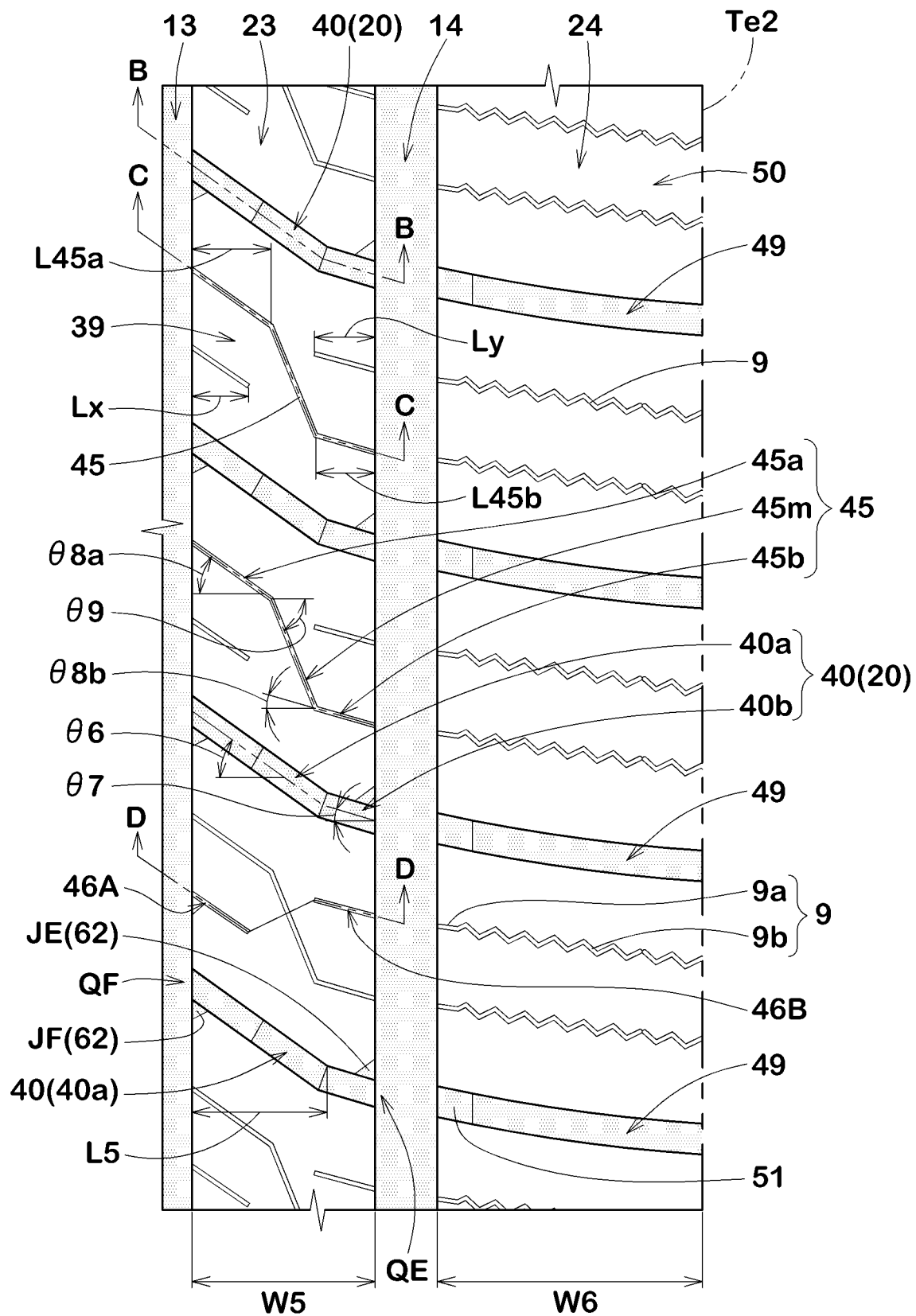
FIG. 11 is an enlarged view of a second middle land region and a second shoulder land region.

FIG. 11 is an enlarged view of the second middle land region 23 and the second shoulder land region 24. It is preferred that a width w5 in the tire axial direction of the second middle land region 23 is in a range of from 0.10 to 0.20 times the tread width Tw. Further, it is preferred that a width w6 in the tire axial direction of the second shoulder land region 24 is in a range of from 0.15 to 0.25 times the tread width TW.

The second middle land region 23 is provided with second groove bodies 20 each made of lateral grooves and intersecting with the second center main groove 13.

Each of the second groove bodies 20 in this embodiment is formed as a middle lateral groove 40. The middle lateral grooves 40 cross the second middle land region 23, therefore, the second middle land region 23 is divided into a plurality of middle blocks 39 by the middle lateral grooves 40.

The middle lateral grooves 40 are inclined in a different direction with respect to the tire axial direction from the first center lateral grooves 5A and the second center lateral grooves 5B. Each of the middle lateral grooves 40 includes an outer lateral groove portion 40a arranged on the outer side of the vehicle and an inner lateral groove portion 40b arranged on the inner side of the vehicle. It is preferred that an angle 96 of the outer lateral groove portion 40a with respect to the tire axial direction is in a range of from 30 to 40 degrees, for example.

The outer lateral groove portion 40a extends from the second center main groove 13 so as to reach a part of the second middle land region 23 on a side of the second shoulder main groove 14 of a widthwise center position in the tire axial direction of the second middle land region 23, for example. It is preferred that a length L5 in the tire axial direction of the outer lateral groove portion 40a is in a range of from 0.65 to 0.80 times the width w5 of the second middle land region 23, for example. An angle θ7 of the inner lateral groove portion 40b with respect to the tire axial direction is preferably smaller than the angle θ6, particularly preferably in a range of from 10 to 20 degrees.

At an intersection portion QF where each of the middle lateral grooves 40 intersects with the second center main groove 13, a chamfered portion 62 is provided at at least one of corner parts at the intersection portion QF (particularly, a corner part JF on a sharp-angled side). In this embodiment, the chamfered portion 62 is also provided at at least one of the corner parts (particularly at a corner part JE on a sharp-angled side) at an intersection portion QE where each of the middle lateral grooves 40 intersects with the second shoulder main groove 14. When running on a snowy road, each of the chamfered portions 62 increases the connection strength between snow blocks in the second center main groove 13 and snow blocks in the middle lateral groove 40, and the connection strength between snow blocks in the second shoulder main groove 14 and snow blocks in the middle lateral groove 40, therefore, the snow shearing force is increased.

In particular, as shown in FIGS. 12A and 12B, an extended region P1*a* obtained by extending the middle lateral groove 15 (first groove body 19) and an extended region P1*b* obtained by extending the first center lateral groove 5A intersect with each other within the first center main groove 12. Further, an extended region P2*a* obtained by extending the middle lateral groove 40 (second groove body 20) and an extended region P2*b* obtained by extending the second center lateral groove 5B intersect with each other within the second center main groove 13. Note that the term "intersect" means that at least a part of the extended regions P1*a* and p1*b* intersect within the first center main groove 12, and at least a part of the extended regions P2*a* and P2*b* intersect within the second center main groove 13. With such a configuration, the chamfered portions 60 and 61 and the chamfered portions 60 and 62 cooperate, therefore, it is possible to further increase the connection strength of the snow blocks.

Figure 13A:
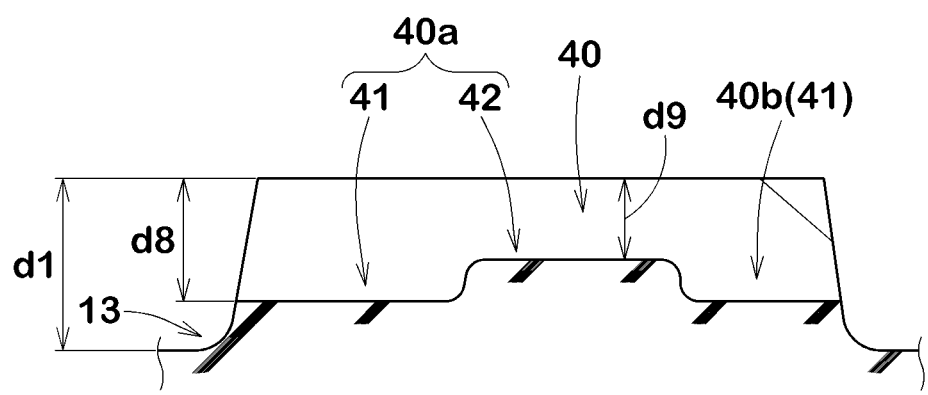
FIG. 13A is a cross-sectional view taken along B-B line of FIG. 11.

FIG. 13A is a cross-sectional view of the middle lateral groove 40 taken along line B-B of FIG. 11. As shown in FIG. 13A, it is preferred that each of the middle lateral grooves 40 includes deep bottom portions 41 and a shallow bottom portion 42 having a depth smaller than those of the deep bottom portions 41. More specifically, it is preferred that the outer lateral groove portion 40*a* has one of the deep bottom portions 41 arranged on the outer side of the vehicle and the shallow bottom portion 42 arranged on the inner side of the vehicle and the inner lateral groove portion 40*b* is formed as another one of the deep bottom portions 41, for example. The middle lateral grooves 40 configured as such maintain rigidity of the second middle land region 23 high by the shallow bottom portions 42.

It is preferred that a depth d8 of each of the deep bottom portions 41 is in a range of from 0.65 to 0.75 times the depth d1 of the second center main groove 13. It is preferred that a depth d9 of each of the shallow bottom portions 42 is in a range of from 0.60 to 0.70 times the depth d8 of each of the deep bottom portions 41.

Each of the middle blocks 39 is provided with one of the crank-shaped middle sipes 45 and a pair of an outer middle closed sipe 46A and an outer middle closed sipe 46B.

Each of the middle sipes 45 includes an outer inclined portion 45*a* extending from the second center main groove 13, an inner inclined portion 45*b* extending from the second shoulder main groove 14, and a middle inclined portion 45*m* extending so as to connect between the outer and inner inclined portions 45*a* and 45*b*.

The outer and inner inclined portions 45*a* and 45*b* are inclined in the same direction as the middle lateral grooves 40. In this embodiment, the middle inclined portions 45*m* are also inclined in the same direction as the middle lateral grooves 40.

It is preferred that an angle θ8*a* of each of the outer inclined portions 45*a* with respect to the tire axial direction is in a range of from 30 to 40 degrees, for example. An angle θ8*b* of each of the inner inclined portions 45*b* with respect to the tire axial direction is preferably smaller than the angle θ8*a*, particularly preferably in a range of from 10 to 20 degrees. Further, an angle θ9 of each of the middle inclined portions 45*m* with respect to the tire axial direction is preferably larger than the angle θ8*a*, particularly preferably in a range of from 65 to 75 degrees.

For the dry steering stability, it is preferred that a length L45*b* of each of the inner inclined portions 45*b* in the tire axial direction is smaller than a length L45*a* of each of the outer inclined portions 45*a* in the tire axial direction. In particular, it is preferred that the length L45*a* is in a range of from 0.4 to 0.5 times the width w5 in the tire axial direction of the second middle land region 23. Further, it is preferred that the length L45*b* is in a range of from 0.1 to 0.3 times the width w5 in the tire axial direction of the second middle land region 23.

Figure 13B:
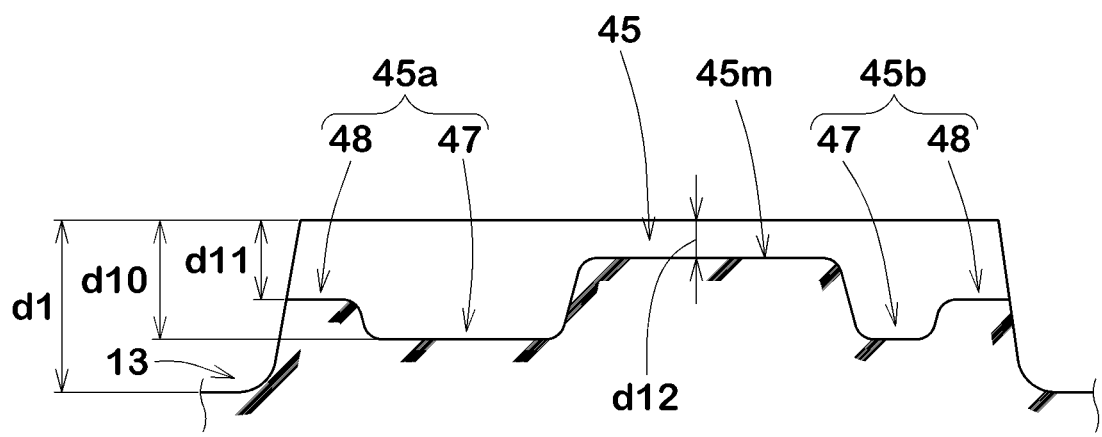
FIG. 13 B is a cross-sectional view taken along C-c line of FIG. 11.

FIG. 13B is a cross-sectional view of one of the middle sipes 45 taken along C-c line of FIG. 11. As shown in FIG. 13B, in each of the middle sipes 45, the middle inclined portion 45*m* has a smaller depth than those of the outer inclined portion 45*a* and the inner inclined portion 45*b*.

Each of the outer and inner inclined portions 45*a* and 45*b* includes a deep bottom portion 47 and a shallow bottom portion 48 having a depth smaller than that of the deep bottom portion 47. In each of the middle sipes 45, each of the shallow bottom portions 48 is arranged at each end of the middle sipe 45, and each of the deep bottom portions 47 is arranged between each of the shallow bottom portions 48 and the middle inclined portion 45*m*, for example. The middle sipes 45 configured as such maintain the rigidity of the second middle land region 23 high by the middle inclined portions 45*m* and the shallow bottom portions 48.

It is preferred that a depth d10 of each of the deep bottom portions 47 is in a range of from 0.65 to 0.75 times the depth d1 of the second center main groove 13. It is preferred that a depth d11 of each of the shallow bottom portions 48 is in a range of from 0.40 to 0.50 times the depth d1 of the second center main groove 13. It is preferred that a depth d12 of each of the middle inclined portions 45*m* is in a range of from 0.15 to 0.25 times the depth d1 of the second center main groove 13.

As shown in FIG. 11, the outer middle closed sipes 46A extend obliquely with respect to the tire axial direction from the second center main groove 13 and terminate within the second middle land region 23. Further, the inner middle closed sipes 46B extend obliquely with respect to the tire axial direction from the second shoulder main groove 14 and terminate within the second middle land region 23. The outer and inner middle closed sipes 46A and 46B are inclined in the same direction as the outer and inner inclined portions 45*a* and 45*b*. It is preferred that a length Lx in the tire axial direction of each of the outer middle closed sipes 46A is in a range of from 60% to 80% of the length L45*a*. It is preferred that a length Ly in the tire axial direction of each of the inner middle closed sipes 468 is in a range of from 90% to 110% of the length L45*b*.

Figure 14:
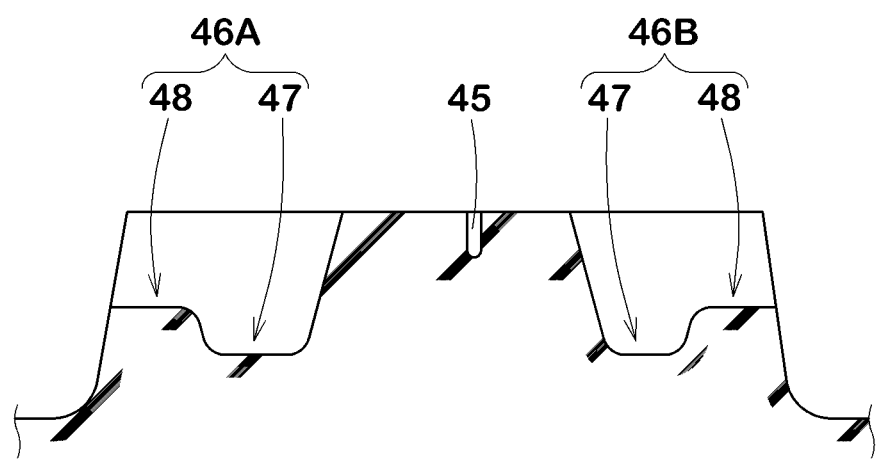
FIG. 14 is a cross-sectional view taken along D-D line of FIG. 11.

FIG. 14 is a cross-sectional view of the outer and inner middle closed sipes 46A and 46B taken along D-D line of FIG. 11. As shown in FIG. 14, each of the outer and inner middle closed sipes 46A and 46B includes a deep bottom portion 47 and a shallow bottom portion 48 having a smaller depth than that of the deep bottom portion 47, for example. Each of the shallow bottom portions 48 is formed at an end portion on a side of the main groove of each of the middle closed sipes 46A and 46B. It is preferred that the depths of the deep bottom portions 47 and the shallow bottom portions 48 of the middle closed sipes 46 are set in the same ranges as the deep bottom portions 47 and the shallow bottom portions 48 of the middle sipes 45, for example. The outer and inner middle closed sipes 46A and 46B configured as such maintain the rigidity of the second middle land region 23 high by the shallow bottom portions 48.

In the second middle land region 23, the middle sipes 45, the middle lateral groove 40, and the inner middle closed sipe 46 B are repeatedly formed in this order toward one side (lower side in FIGS. 1 and 11) in the tire circumferential direction. Further, the middle sipes 45, the middle lateral groove 40, and the outer middle closed sipe 46A are repeatedly formed in this order toward the other side (upper side in FIGS. 1 and 11) in the tire circumferential direction. Such an arrangement increases uniformity of the rigidity in the tire circumferential direction, therefore, it is advantageous to uneven wear resistance.

As shown in FIG. 11, the second shoulder land region 24 is provided with a plurality of shoulder sipes 9 each having an open end connected with the second shoulder main groove 14. Each of the shoulder sipes 9 includes a straight portion 9a extending from the second shoulder main groove 14 and a zigzag portion 9b extending in a zigzag manner so as to connect between the straight portion 9a and the second tread edge Te2. It is preferred that the shoulder sipes 9 are inclined in the same direction as the middle sipes 45 with respect to the tire axial direction, and in particular, it is preferred that an inclination angle of each of the shoulder sipes 9 with respect to the tire axial direction is smaller than the angle θ8b of each of the inner inclined portions 45b.

In addition to the shoulder sipes 9, the second shoulder land region 24 is provided with a plurality of shoulder lateral grooves 49 crossing the second shoulder land region 24. Thereby, the second shoulder land region 24 is divided into a plurality of shoulder blocks 50. Each of the shoulder blocks 50 is provided with two shoulder sipes 9. Each of the shoulder lateral grooves 49 extends along the shoulder sipes 9, and is provided with a tie bar 51 formed by partially raising a bottom surface thereof at an inner end thereof.

In this embodiment, each of the shoulder lateral grooves 49 is arranged on an extension of one of the middle lateral grooves 40. Thereby, during running on a snowy road, large snow blocks can be formed by the middle lateral grooves 40, the shoulder lateral grooves 49, and the second shoulder main groove 14, therefore, it is possible that the on-snow performance is improved.

while detailed description has been made of the tire as an embodiment of the present invention, the present invention can be embodied in various forms without being limited to the illustrated embodiment.

Working Example (Example)

Tires of size 215/60R16 having a basic tread pattern shown in FIG. 1 were made by way of test according to the specification listed in Table 1. In Reference 1, as shown in FIG. 4A, the first center lateral groove 5A and the second center closed sipe 6a are not opposed to each other and the first center closed sipe 6b and the second center lateral groove 5B are not opposed to each other, whereby the high rigidity region Y is not formed. In Reference 2, the length Lb is smaller than one third of the extended length Lb0 and the length La is smaller than one third of the extended length La0, therefore, edge lengths are insufficient although the high rigidity region Y is formed. In Reference 3, the length Lb is larger than two thirds of the extended length Lb0 and the length La is larger than two thirds of the extended length La0, therefore, the high rigidity region Y is not formed. In Reference 4, the length LA is larger than a half of the extended length LA0 and the length LB is larger than a half of the extended length LB0, therefore, the high rigidity region Y is not formed. Each of the test tires was tested for the on-ice/on-snow performance and the dry steering stability. Common specifications of the test tires and the test methods are as follows.

Tire rim: 16×63
Tire inner pressure: 210 kPa
Test vehicle: front wheel drive car with a displacement of 2400 cc
Tire mounting position: all wheels
<On-Ice/On-Snow Performance>
A distance needed for accelerating the above test car from 5 km/h to 20 km/h on an icy/snowy road was measured by GPS and an average acceleration was calculated. The results are indicated by an index based on the average acceleration of the Reference 1 being 100, wherein the larger the numerical value, the better the on-ice/on-snow performance is.
<Dry Steering Stability>
During a driver driving the test car on a dry road surface, the steering stability was evaluated by the driver's feeling. The results are indicated by an index based on the Reference 1 being 100, wherein the larger the numerical value, the better the steering stability on a dry road surface is.

The test results are shown in Table 1.

TABLE 1

|  | Ref. 1 | Ref. 2 | Ref. 3 | Ref. 4 | Ex. 1 | Ex. 2 |
|---|---|---|---|---|---|---|
| <Center land region> | FIG. 4A |  |  | FIG. 2 |  |  |
| Position of Lateral groove 5A and Lateral sipe 6a | Not opposed |  |  | Opposed |  |  |
| Position of Lateral groove 5B and Lateral sipe 6b | Not opposed |  |  | Opposed |  |  |
| Length LA/Extended length LA0 | 0.23 | 0.23 | 0.23 | 0.52 | 0.23 | 0.23 |
| Length LB/Extended length LB0 | 0.23 | 0.23 | 0.23 | 0.52 | 0.23 | 0.23 |
| Length Lb/Extended length Lb0 | 0.53 | 0.31 | 0.70 | 0.53 | 0.53 | 0.53 |
| Length La/Extended length La0 | 0.53 | 0.31 | 0.70 | 0.53 | 0.53 | 0.53 |
| Length LA/Length La | 0.43 | 0.76 | 0.34 | 0.94 | 0.43 | 0.43 |
| Sum (LA + La)/Length LA0 | 0.74 | 0.52 | 0.88 | 1.10 | 0.74 | 0.74 |
| Length LB/Length Lb | 0.43 | 0.76 | 0.34 | 0.94 | 0.43 | 0.43 |

TABLE 1-continued

| | | | | | | |
|---|---|---|---|---|---|---|
| Sum (LB + Lb)/Length LB0 | 0.74 | 0.52 | 0.88 | 1.10 | 0.74 | 0.74 |
| Presence or absence of High rigidity region | Absence | Presence | Absence | Absence | Presence | Presence |
| First and second imaginary lines | — | Parallel | — | — | Parallel | Parallel |
| Penetrating sipe | | | Hook-shaped | | | |
| Depth d15 of Joint sipe portion/Minimum depth d14 of First and second sipe portions | | | 0.75 | | | 1.3 |
| Depth d15 of Joint sipe portion/Depth d1 of First and Second center main grooves | | | 0.33 | | | 0.44 |
| Presence or absence of Chamfered portion at Corner part of Center lateral groove | | | Presence | | | |
| <Middle land region> | | | | | | |
| Presence or absence of chamfered portion at Corner part of First and Second groove bodies | | | Presence | | | |
| Dry steering stability | 100 | 110 | 95 | 90 | 115 | 110 |
| On-ice/on-snow Performance | 100 | 95 | 105 | 110 | 110 | 110 |

| | Ex. 3 | Ex. 4 | Ex. 5 | Ex. 6 | Ex. 7 | Ex. 8 |
|---|---|---|---|---|---|---|
| <Center land region> | | | | | | |
| Position of Lateral groove 5A and Lateral sipe 6a | | | FIG. 2 Opposed | | | |
| Position of Lateral groove 5B and Lateral sipe 6b | | | Opposed | | | |
| Length LA/Extended length LA0 | 0.23 | 0.23 | 0.23 | 0.50 | 0.23 | 0.31 |
| Length LB/Extended length LB0 | 0.23 | 0.23 | 0.23 | 0.50 | 0.23 | 0.31 |
| Length Lb/Extended length Lb0 | 0.53 | 0.53 | 0.53 | 0.53 | 0.35 | 0.62 |
| Length La/Extended length La0 | 0.53 | 0.53 | 0.53 | 0.53 | 0.35 | 0.62 |
| Length LA/Length La | 0.43 | 0.43 | 0.43 | 0.54 | 0.69 | 0.53 |
| Sum (LA + La)/Length LA0 | 0.74 | 0.74 | 0.74 | 1.00 | 0.55 | 0.90 |
| Length LB/Length Lb | 0.43 | 0.43 | 0.43 | 0.54 | 0.69 | 0.53 |
| Sum (LB + Lb)/Length LB0 | 0.74 | 0.74 | 0.74 | 1.00 | 0.55 | 0.90 |
| Presence or absence of High rigidity region | | | Presence | | | |
| First and Second imaginary lines | | | Parallel | | | |
| Penetrating sipe | | | Hook-shaped | | | |
| Depth d15 of Joint sipe portion/Minimum depth d14 of First and second sipe portions | | | 0.75 | | | |
| Depth d15 of Joint sipe portion/Depth d1 of First and Second center main grooves | | | 0.33 | | | |
| Presence or absence of Chamfered portion at Corner part of Center lateral groove | Absence | Presence | Absence | | Presence | |
| <Middle land region> | | | | | | |
| Presence or absence of Chamfered portion at Corner part of First and Second groove bodies | Presence | Absence | Absence | | Presence | |
| Dry steering stability | 115 | 115 | 115 | 105 | 110 | 105 |
| On-ice/on-snow Performance | 108 | 108 | 105 | 110 | 105 | 115 |

From the test results, it was confirmed that the tires as the Examples exert both the dry steering stability and the on-ice/on-snow performance at a high level.

The invention claimed is:

1. A tire comprising a tread portion divided into five land regions including a center land region arranged on a tire equator by four main grooves extending continuously in a tire circumferential direction and including center main grooves, wherein
the center land region is divided into a plurality of center blocks by penetrating sipes crossing the center land region,
each of the center blocks includes a first center lateral groove, a first center closed sipe, a second center lateral groove, and a second center closed sipe,
the first center lateral groove extends from a first side edge arranged on one side in a tire axial direction of the center land region and terminates within the center block,
the first center closed sipe extends from the first side edge and terminates within the center block,
the second center lateral groove extends from a second side edge arranged on the other side in the tire axial direction of the center land region, terminates within the center block, and is opposed to the first center closed sipe in the tire axial direction,
the second center closed sipe extends from the second side edge, terminates within the center block, and is opposed to the first center lateral groove in the tire axial direction,
a length LA of the first center lateral groove is not more than half of an extended length LA0 obtained by extending the first center lateral groove to the second side edge,
a length LB of the second center lateral groove is not more than half of an extended length LB0 obtained by extending the second center lateral groove to the first side edge,
a length Lb of the first center closed sipe is in a range of from one third to two thirds of an extended length Lb0 obtained by extending the first center closed sipe to the second side edge,
a length La of the second center closed sipe is in a range of from one third to two thirds of an extended length La0 obtained by extending the second center closed sipe to the first side edge,
the length LA is smaller than the length La,
a sum (LA+La) is smaller than the extended length LA0,
the length LB is smaller than the length Lb,
a sum (LB+Lb) is smaller than the extended length LB0,
each of the center blocks includes a high rigidity region defined between a first imaginary line and a second imaginary line and extending continuously and straight between a pair of the penetrating sipes, the first imaginary line passes through a terminating end of the first center lateral groove and a terminating end of the first center closed sipe, the second imaginary line passes through a terminating end of the second center lateral groove and a terminating end of the second center closed sipe, and the high rigidity region is provided with no grooves and sipes, and is inclined with respect to the tire circumferential direction, wherein the high rigidity region is inclined to a side different from the first center lateral groove and the second center lateral groove with respect to the tire axial direction.

2. The tire according to claim 1, wherein the first center lateral groove, the second center lateral groove, the first center closed sipe, the second center closed sipe, and the penetrating sipes are inclined to the same side with respect to the tire axial direction.

3. The tire according to claim 1, wherein the first imaginary line and the second imaginary line are parallel to each other.

4. The tire according to claim 1, wherein each of the penetrating sipes includes a first sipe portion extending from the first side edge, a second sipe portion extending from the second side edge, and a joint sipe portion connecting between the first sipe portion and the second sipe portion, and a depth of the joint sipe portion is smaller than depths of the first sipe portion and the second sipe portion.

5. The tire according to claim 4, wherein the depth of the first sipe portion and the depth of the second sipe portion are equal and the depth of the joint sipe portion is not more than one third of a depth of each of the center main grooves.

6. The tire according to claim 4, wherein the first sipe portion and the second sipe portion are inclined to the same side with respect to the tire axial direction.

7. The tire according to claim 6, wherein the first sipe portion and the second sipe portion are inclined at an angle in a range of from 30 to 40 degrees with respect to the tire axial direction.

8. The tire according to claim 1, wherein each of the center blocks includes intersection portions where the first and second center lateral grooves each intersects with a corresponding one of the main grooves,
the intersection portions have corner parts, and
a chamfered portion is provided at one or more of the corner parts.

9. The tire according to claim 8, wherein the center main grooves include a first center main groove and a second center main groove,
the land regions include a first middle land region arranged adjacently to the center land region on one side in the tire axial direction with the first center main groove therebetween, and a second middle land region arranged adjacently to the center land region on the other side in the tire axial direction with the second center main groove therebetween,
the first middle land region includes a first groove body and the second middle land region includes a second groove body,
the first groove body and the second groove body are made of lateral groove portions, the first groove body comprises an intersection portion where the first groove body intersects with the first center main groove and a chamfered portion provided at one or more of corner parts of the intersection portion of the first groove body,
the second groove body comprises an intersection portion where the second groove body intersects with the second center main groove and a chamfered portion provided at one or more of corner parts of the intersection portion of the second groove body,
an extended region obtained by extending the first groove body and an extended region obtained by extending the first center lateral groove intersect with each other within the first center main groove, and
an extended region obtained by extending the second groove body and an extended region obtained by extending the second center lateral groove intersect with each other within the second center main groove.

10. The tire according to claim 1, wherein the first center closed sipe and the second center closed sipe are parallel to each other.

11. A tire comprising a tread portion divided into five land regions including a center land region arranged on a tire equator by four main grooves extending continuously in a tire circumferential direction and including center main grooves, wherein
the center land region is divided into a plurality of center blocks by penetrating sipes crossing the center land region,
each of the center blocks includes a first center lateral groove, a first center closed sipe, a second center lateral groove, and a second center closed sipe,
the first center lateral groove extends from a first side edge arranged on one side in a tire axial direction of the center land region and terminates within the center block,
the first center closed sipe extends from the first side edge and terminates within the center block,
the second center lateral groove extends from a second side edge arranged on the other side in the tire axial direction of the center land region, terminates within the center block, and is opposed to the first center closed sipe in the tire axial direction,
the second center closed sipe extends from the second side edge, terminates within the center block, and is opposed to the first center lateral groove in the tire axial direction,
a length LA of the first center lateral groove is not more than half of an extended length LA0 obtained by extending the first center lateral groove to the second side edge,
a length LB of the second center lateral groove is not more than half of an extended length LB0 obtained by extending the second center lateral groove to the first side edge,
a length Lb of the first center closed sipe is in a range of from one third to two thirds of an extended length Lb0 obtained by extending the first center closed sipe to the second side edge,
a length La of the second center closed sipe is in a range of from one third to two thirds of an extended length La0 obtained by extending the second center closed sipe to the first side edge, the length LA is smaller than the length La,
a sum (LA+La) is smaller than the extended length LA0,
the length LB is smaller than the length Lb,
a sum (LB+Lb) is smaller than the extended length LB0, each of the center blocks includes a high rigidity region defined between a first imaginary line and a second imaginary line and extending continuously and straight between a pair of the penetrating sipes, the first imaginary line passes through a terminating end of the first center lateral groove and a terminating end of the first center closed sipe, the second imaginary line passes through a terminating end of the second center lateral groove and a terminating end of the second center closed sipe, the high rigidity region is provided with no grooves and sipes, and the penetrating sipes are crank-shaped, wherein the high rigidity region is inclined to a side different from the first center lateral groove and the second center lateral groove with respect to the tire axial direction.

12. The tire according to claim 11, wherein the first center lateral groove, the second center lateral groove, the first center closed sipe, the second center closed sipe, and the penetrating sipes are inclined to the same side with respect to the tire axial direction.

13. The tire according to claim 11, wherein the first imaginary line and the second imaginary line are parallel to each other.

14. The tire according to claim 11, wherein each of the center blocks includes intersection portions where the first and second center lateral grooves each intersects with a corresponding one of the main grooves, the intersection portions have corner parts, and a chamfered portion is provided at one or more of the corner parts.

15. A tire comprising a tread portion divided into five land regions including a center land region arranged on a tire equator by four main grooves extending continuously in a tire circumferential direction and including center main grooves, wherein the center land region is divided into a plurality of center blocks by penetrating sipes crossing the center land region, each of the center blocks includes a first center lateral groove, a first center closed sipe, a second center lateral groove, and a second center closed sipe, the first center lateral groove extends from a first side edge arranged on one side in a tire axial direction of the center land region and terminates within the center block, the first center closed sipe extends from the first side edge and terminates within the center block, the second center lateral groove extends from a second side edge arranged on the other side in the tire axial direction of the center land region, terminates within the center block, and is opposed to the first center closed sipe in the tire axial direction, the second center closed sipe extends from the second side edge, terminates within the center block, and is opposed to the first center lateral groove in the tire axial direction, a length LA of the first center lateral groove is not more than half of an extended length LA0 obtained by extending the first center lateral groove to the second side edge, a length LB of the second center lateral groove is not more than half of an extended length LB0 obtained by extending the second center lateral groove to the first side edge, a length Lb of the first center closed sipe is in a range of from one third to two thirds of an extended length Lb0 obtained by extending the first center closed sipe to the second side edge, a length La of the second center closed sipe is in a range of from one third to two thirds of an extended length La0 obtained by extending the second center closed sipe to the first side edge, the length LA is smaller than the length La, a sum (LA+La) is smaller than the extended length LA0, the length LB is smaller than the length Lb, a sum (LB+Lb) is smaller than the extended length LB0, each of the center blocks includes a high rigidity region defined between a first imaginary line and a second imaginary line and extending continuously and straight between a pair of the penetrating sipes, the first imaginary line passes through a terminating end of the first center lateral groove and a terminating end of the first center closed sipe, the second imaginary line passes through a terminating end of the second center lateral groove and a terminating end of the second center closed sipe, the high rigidity region is provided with no grooves and sipes, each of the center blocks includes intersection portions where the first and second center lateral grooves each intersects with a corresponding one of the main grooves, the intersection portions have corner parts, and a chamfered portion is provided at one or more of the corner part, wherein the high rigidity region is inclined to a side different from the first center lateral groove and the second center lateral groove with respect to the tire axial direction.

16. The tire according to claim 15, wherein the center main grooves include a first center main groove and a second center main groove, the land regions include a first middle land region arranged adjacently to the center land region on one side in the tire axial direction with the first center main groove therebetween, and a second middle land region arranged adjacently to the center land region on the other side in the tire axial direction with the second center main groove therebetween, the first middle land region includes a first groove body and the second middle land region includes a second groove body, the first groove body and the second groove body are made of lateral groove portions, the first groove body comprises an intersection portion where the first groove body intersects with the first center main groove and a chamfered portion provided at one or more of corner parts of the intersection portion of the first groove body, the second groove body comprises an intersection portion where the second groove body intersects with the second center main groove and a chamfered portion provided at one or more of corner parts of the intersection portion of the second groove body, an extended region obtained by extending the first groove body and an extended region obtained by extending the first center lateral groove intersect with each other within the first center main groove, and an extended region obtained by extending the second groove body and an extended region obtained by extending the second center lateral groove intersect with each other within the second center main groove.

17. The tire according to claim 15, wherein
the first center lateral groove, the second center lateral groove, the first center closed sipe, the second center closed sipe, and the penetrating sipes are inclined to the same side with respect to the tire axial direction.

* * * * *